United States Patent [19]
Nagatani et al.

[11] Patent Number: 5,764,845
[45] Date of Patent: Jun. 9, 1998

[54] LIGHT GUIDE DEVICE, LIGHT SOURCE DEVICE, AND LIQUID CRYSTAL DISPLAY DEVICE

[75] Inventors: Shinpei Nagatani; Fumiaki Yamada; Motohiko Fukuhara, all of Kawasaki, Japan

[73] Assignee: Fujitsu Limited, Kawasaki, Japan

[21] Appl. No.: 265,678

[22] Filed: Jun. 24, 1994

[30] Foreign Application Priority Data

Aug. 3, 1993 [JP] Japan ..................... 5-192585

[51] Int. Cl.$^6$ ...................... G02B 6/26
[52] U.S. Cl. .............. 385/146; 385/89; 385/88; 385/901
[58] Field of Search ............ 385/15, 31, 34, 385/38, 39, 43, 88–94, 115, 120, 121, 146, 901; 362/32

[56] References Cited

U.S. PATENT DOCUMENTS

| | | | |
|---|---|---|---|
| 2,589,569 | 3/1952 | Peter et al. | 385/901 |
| 3,901,581 | 8/1975 | Theil | 385/43 |
| 4,240,692 | 12/1980 | Winston | 385/146 |
| 4,382,656 | 5/1983 | Gilby | 385/146 |
| 4,915,479 | 4/1990 | Clarke | 362/32 |
| 4,978,186 | 12/1990 | Mori | 350/96.1 |
| 5,093,890 | 3/1992 | Bregmann et al. | 385/146 |
| 5,359,691 | 10/1994 | Tai et al. | 362/32 |
| 5,462,700 | 10/1995 | Beeson et al. | 385/146 |
| 5,475,571 | 12/1995 | Dassananyake | 385/901 |

FOREIGN PATENT DOCUMENTS

| | | |
|---|---|---|
| 0024646 | 2/1979 | Japan. |
| 0075704 | 4/1988 | Japan. |

Primary Examiner—John Ngo
Attorney, Agent, or Firm—Greer, Burns & Crain, Ltd.

[57] ABSTRACT

An object of the present invention is to provide a light guide device which can emit light rays of high directivity with high efficiency irrespective of incident angles, and a light source device using the light guide device which can provide light rays of high directivity with high efficiency irrespective of emitting characteristics of light source lamps, and a liquid crystal display device which is small-sized and can display at very high luminance and is free from color tone changes depending on visual angles over a wide field angle. A substantial point light source is contained in a reflection box having an inside wall coated with a silver reflecting surface and an opening in the shape of a pinhole formed in a surface of the reflection box, and the light guide device is provided in the pinhole-shaped opening. The light guide device is a cylindrical transparent body. An incident end surface of the light guide device has a 1 mm-diameter, and an exit end surface of the light guide device has a 6.2 mm-diameter and a 100 mm-length. Source light from the substantial light source enters the incident end surface of the light guide device through the pinhole-shaped opening, repeats total reflection within the light guide device to exit at the exit end surface in light rays of high directivity of about ±10°.

43 Claims, 27 Drawing Sheets

FIG.1A
FIG.1B
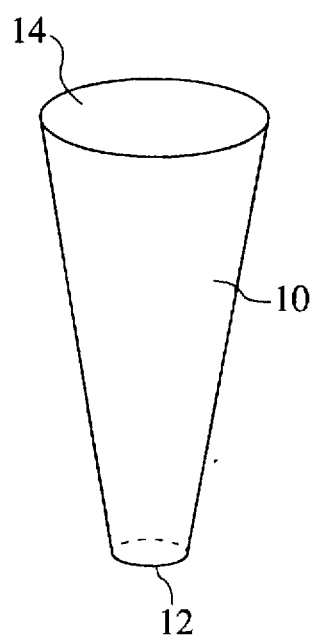
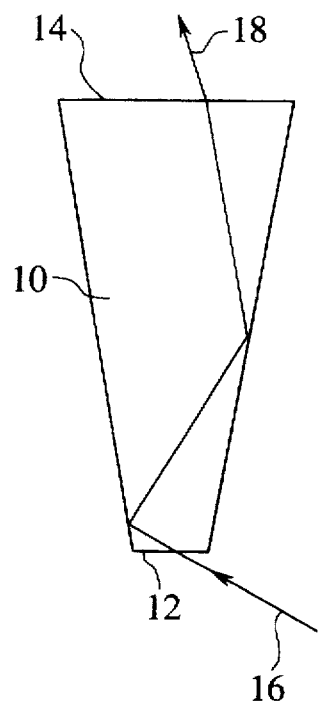

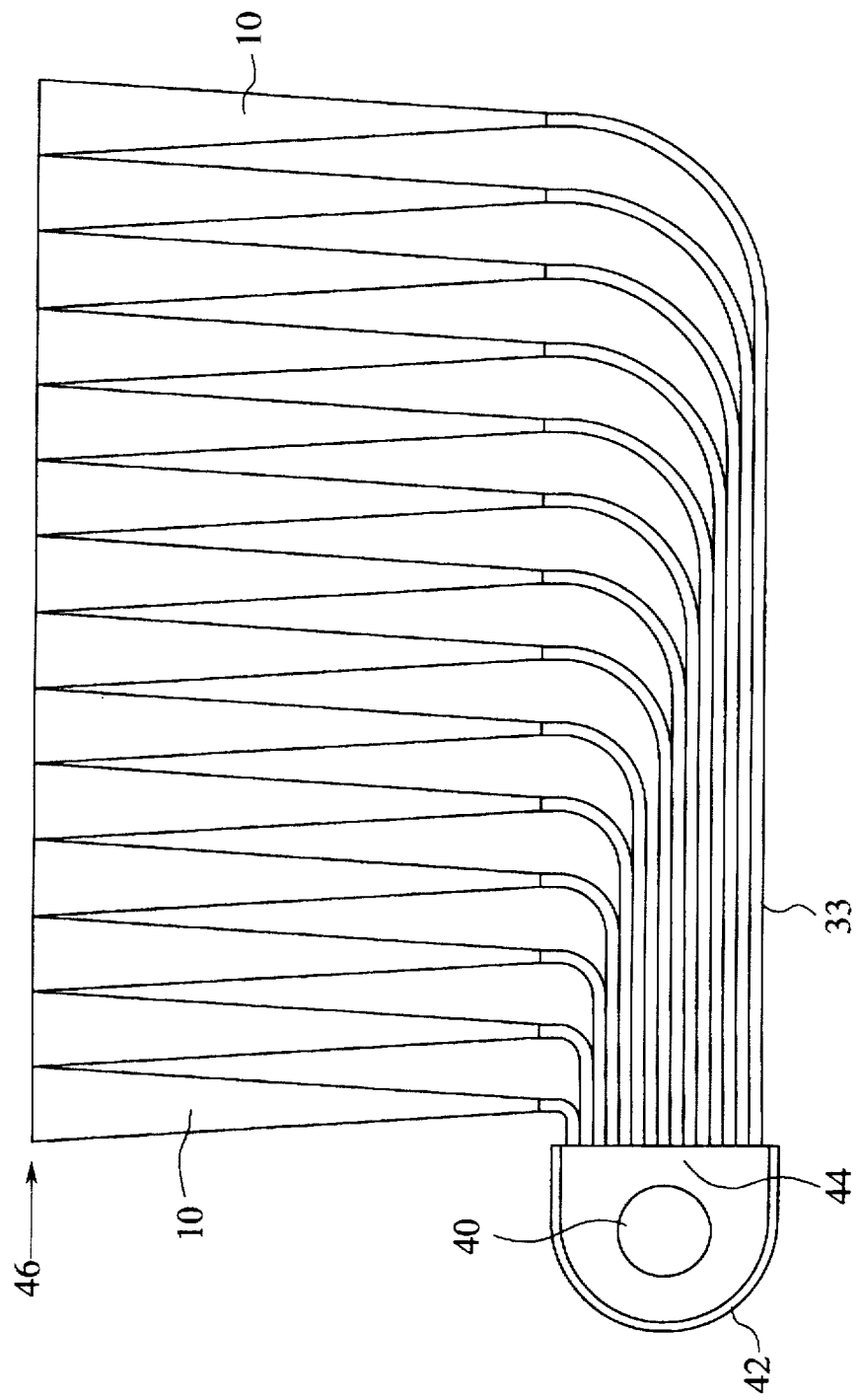

UV IRRADIATION

LIGHT GUIDE DEVICE, LIGHT SOURCE DEVICE, AND LIQUID CRYSTAL DISPLAY DEVICE

BACKGROUND OF THE INVENTION

The present invention relates to a light guide device, especially a light guide device for providing light rays of high directivity, and a light source device which can realize source light of very high directivity by the use of the light guide device, and a liquid crystal display device which can be small-sized and can display at very high luminance and can be free from color tone changes depending on visual angles over a wide field angle.

Generally light source devices used in spot lights and image forming optical systems demand high directivity. Light rays of very high directivity called parallel rays are demanded in image forming optical systems for magnifying light which has passed through, e.g., panels of liquid crystal display devices and projecting the same on screens.

A conventional optical device for use mainly in projection optical systems will be explained with reference to a schematic sectional view of FIG. 27.

As a light source 60, e.g., halogen lamp or a metal halide lamp is used. A reflecting mirror 62 is disposed around the outer circumference of the light source 60. The reflecting mirror 62 has suitable set surface angles at respective positions so that source light form the light source 60 has substantially parallel rays. That is, the reflecting mirror 62 has a shape having reflection angles set so that all source light becomes exiting light rays of a set directivity at final with the light source 60 being a point, and generally depicts a parabola.

Accordingly the source light from the light source 60 is reflected by the reflecting mirror 62 to be exiting light rays 64 of high directivity in the form of substantially parallel rays.

Thus the light source devices used in spot lights for the general lighting, and in image forming optical systems use light sources whose light emitting forms, such as filaments, are substantially point light sources, and condense their source light by reflecting mirrors so as to improve directivity.

But in such conventional light source devices, to condense light by the reflecting mirrors, it is necessary to position the reflecting mirrors at distances from the light sources, which allow the light sources which are actually light emitting points at finite distances from the reflecting mirrors to be accepted as point light sources. The reflecting mirrors must be large-sized, and it is difficult to reduce the size of the light source devices themselves. This is a problem.

To meet the condition that light sources which are substantially point light sources, halogen lamps, metal halide lamps, etc., which are generally highly efficient and bright, are used as substantially point light sources. The light source represented by such metal halide lamps, etc. have short life times. This is their disadvantage. Conversely, light sources, such as fluorescent tubes, which have long life times and high efficiency, cannot be used because they are diffused light sources. This is also a problem.

The substantial point light sources, such as metal halide lamps, etc., do not instantaneously light and take long cooling periods of time to light again after the light sources are lit. This is also a problem.

Light rays which are not considered in designs are reduced to useless light rays because such light source, which are called substantial point light sources, are actually provided by finite light sources, which lower efficiency. This is also a problem.

SUMMARY OF THE INVENTION

A first object of the present invention is to provide a light guide device for efficiently emitting light rays of high directivity irrespective of incident angles of incident light, and a method for fabricating the light guide device.

A second object of the present invention is to provide a light source device which is small in size and can provide light rays of high directivity by the light guide device irrespective of emitting characteristics of a light source lamp.

A third object of the present invention is to provide a liquid crystal display device which is small in size can display at very high luminance and is free from color tone changes depending on visual angles over a wide field angle.

The first object is achieved by a light guide device comprising an pole-shaped transparent body having a incident end surface on which light is incident having a smaller area, and a exit end surface at which the light exit in light rays having a larger area.

In the above-described light guide device it is preferred that, an area of the exit end surface is 3 times or more than that of the incident end surface.

In the above-described light guide device, the pole-shaped transparent body is cylindrical and polygonal near at least one of the incident end surface and the exit end surface.

The above-described light guide device, a coating layer is provided on an outer circumferential portion of the transparent pole-shaped body and having a hardness below the transparent pole-shaped body.

The above-described light guide device, further comprises an assistant member in a form of prism disposed on the exit end surface of the light guide device, for correcting a direction of the exit light ray.

A light guide device may comprise a line of the above-described light guide devices arranged in parallel with each other, and formed integral; a first connection disposed on one end of the line of the light guide devices, and having a partial shape of the light guide devices; and a second connection disposed on the other end of the line of the light guide devices, having a partial shape of the light guide devices which is different from that of the first connection, the second connection making up together with the first connection substantially the same shape as the light guide device.

The above-described light guide device comprises a light guide unit including light guide devices arranged in rows or in plane, and a resin layer formed on the exit end surface of the arranged light guide devices in one piece therewith, and having substantially the same refractive index and light transmittance as the light guide device.

In the above-described light guide device it is preferred that, a refractive index ratio between the resin layer and the light guide devices is above about 0.97.

The first object is achieved by a method for fabricating the above-described light guide device comprising the steps of arranging a plurality of the light guide devices in plane, applying a UV solidifying resin having substantially the same refractive index and light transmittance as the light guide devices onto the exit end surface defined by the plural light guide devices, and solidifying the UV solidifying resin by UV radiation to form the resin layer formed integral with the plural light guide devices.

In the above-described method for fabricating a light guide device, when the UV solidifying resin is solidified, UV radiation is applied with a specular plate placed on the surface of the UV solidifying resin.

The first object is achieved by a method for fabricating the above-described light guide device comprising the steps of arranging a plurality of the light guide devices in plane, placing the exit end surface of the arranged light guide devices in a vessel holding a polymerization adhesive having substantially the same refractive index and light transmittance as the light guide devices, and polymerization adhering, in this state, the resin to the light guide devices, whereby the resin layer is formed integral with the plural light guide devices.

In the above-described method, the vessel has the interior surface formed in a speculum.

The second object is achieved by a light source device comprising a light source, a reflection box containing the light source and having the inside wall coated with a reflecting surface, an opening formed in a side of the reflection box, and the above-described light guide device disposed with the incident end surface opposed to the light source.

In the above-described light source device there is disposed a light guide member for optically coupling the opening and the incident end surface of the light guide device.

In the above-described light source device, the light guide member is a flexible fiber light guide member.

In the above-described light source device the light guide member is a pole-shaped member having a slant reflecting surface on the end surface contacting the incident end surface of the light guide device.

In the above-described light source device the light source device is a substantial point light source, the opening is at least one pinhole, and the light guide device is disposed in the pinhole.

In the above-described light source device the light source is a substantial point light source, the opening is a slit, a plurality of the light guide devices are arranged linearly along the slit, and the light guide devices arranged linearly along the slit are arranged in at least one line.

In the above-described light source device, the light source is a linear light source, the opening is a plurality of pinholes arranged in a line or a matrix along the linear light source, and a plurality of the light guide devices are arranged in a line or a matrix along the arrangement of the pinholes.

In the above-described light source device the light source is a linear light source, the opening is a slit, and a plurality of the slits are disposed along the linear light source, a plurality of the light guide devices are disposed along the slit, and a plurality of lines of the light guide devices are disposed along the arrangement of the slit, and exit end surfaces of the light guide devices are arranged in a line or a matrix.

In the above-described light source device, the plurality of the light guide devices are arranged in a fan-shape.

In the above-described light source device there is provided a reflecting mirror for reflecting light exiting from the exit end surfaces of the light guide devices arranged in a line or a matrix, and reflected light from the reflecting mirror is substantially parallel light rays.

In the above-described light source device the opening is a stripe or a plurality of pinholes linearly arranged along the linear light source, the fiber light guide member is a plurality of bundles of fiber light guide members for optically coupling the opening in the shape of a stripe or a plurality of pinholes with the incident end surfaces of the plural light guide devices arranged in a matrix, and the plural fiber light guide members are adjusted in terms of length and flexure so that the exit end surfaces of the light guide devices are arranged in a line or a matrix on the same level.

In the above-described light source device the opening is a stripe or a plurality of pinholes, the pole-shaped light guide member is a plurality of bundles of pole-shaped light guide members for optically coupling the opening in the shape of the stripe or the plural pinholes with the incident end surfaces of the plural light guide devices arranged in a matrix, circular pole-shaped or rectangular pole-shaped transparent assistant members of set lengths are disposed between the slant reflecting surfaces of the pole-shaped light guide members or the end surfaces of the prisms with the slant reflecting surfaces, and the incident end surfaces of the light guide, or on the forward ends of the assistant members of the light guide devices, and the assistant light guide members are adjusted in terms of length so that the exit end surfaces of the light guide devices are arranged in a line or a matrix on the same level.

In the above-described light source device the light source is a plurality of parallel linear light sources, the opening is a plurality of pinholes arranged in a matrix, and a plurality of the light guide devices are arranged in a matrix corresponding to the matrix of the pinhole.

In the above-described light source device the exit end surfaces of the arranged light guide devices are on the same level.

The third object is achieved by a liquid crystal display device comprising the light source device, and a liquid crystal panel disposed on the exit surface of the light source device.

The above-described liquid crystal display device further comprises a light diffusing sheet for diffusing light beams of directivity disposed on the liquid crystal panel.

According to the present invention, the light guide device is a pole-shaped transparent body, and has a smaller-area end surface as the incident end surface and a larger-area end surface as the exit end surface, whereby light incident on the incident end surface reaches the boundary surface of the light guide device to reflect in accordance with the law of total reflection, and reaches the opposed boundary surface to reflect thereon. The light repeatedly thus reflects and gradually changes into light rays vertical to the exit end surface and exits in the light rays at the exit end surface. Thus even when the incident light is diffused light, exit light rays of high directivity are available with high efficiency.

The cylindrical transparent light guide device is used, and light is incident on the smaller-area incident end surface, whereby even the incident light is diffused light, highly directive light rays can exit at the exit end surface with high efficiency.

The exterior surface of the light guide devices are coated with the coating layer of a lower hardness, and the light source device can have little luminance disuniformity.

A plurality of the light guide devices are interconnected to each other in a line of the light guide devices. Accordingly non-light emitting parts are absent, and groups of the light guide devices having a uniform luminance on the surface can be formed.

The acrylic resin layer having substantially the same refractive index as the light guide devices is provided integral with the light guide devices on the exit surface defined by the light guide devices. Accordingly the light guide device can have little disuniformity of a luminance and good directivity.

In the light source device using the above-described light guide device, i.e., the light guide device is disposed in the opening in a surface of the reflection box containing the light source with the incident end surface opposed to the light source, whereby light rays of high directivity can exit at the exit end surface of the light guide device with high efficiency irrespective of emitting characteristics of the light source, i.e., whether the light source is a point light source or a diffused light source.

The optical fiber as a light guide component which optically couples the incident end surface of the light guide device with the substantial point light source, and a length and flexure of which are adjustable is disposed, whereby light rays of high directivity can be emitted with high efficiency in a prescribed direction at a prescribed position distant from the substantial point light source.

The rectangular pole-shaped light guide member as a light guide component which optically couples the incident end surface of the light guide device with the substantial point light source, and a length of which are adjustable is disposed, whereby light rays of high directivity can be emitted with high efficiency in a prescribed direction at a prescribed position distant from the substantial point light source.

A substantial point light source, and the incident end surfaces of a plurality of the light guide devices are optically coupled to each other through the opening in the form of a slit or pinhole-shaped, whereby a plurality of light rays of high directivity can exit with high efficiency.

The incident end surfaces of a plurality of light guide devices and the substantial point light source are optically coupled to each other through the opening in the form of a slit, and the reflecting mirror is provided for reflecting the exit light rays from the exit end surfaces, whereby substantial parallel rays of high directivity can be emitted with high efficiency. The presence of the reflecting mirror allows the light source device itself to be small in size because the light guide device is sufficiently small.

The linear light source is used as the light source, and the incident end surfaces of the plural light guide devices and the linear light source are optically coupled with each other through the plural pinhole-shaped openings formed along the linear light source, whereby light rays of high directivity can be emitted with high efficiency from the plural end surfaces arranged linearly on a set level.

The stripe-shaped opening with a large opening area is used, whereby light rays of directivity can be more efficiently emitted from the exit end surfaces and can have higher luminance, while the respective optical fibers optically coupling the linear light source and the plural light guide devices are adjusted in terms of elongation and flexure, whereby the plural exit end surfaces arranged in a matrix can define a single plane exit surface.

The stripe-shaped opening is used, the linear light source and the incident end surfaces of the plural light guide devices are optically coupled with each other by the rectangular pole light guide members, while lengths of the pole-shaped assistant members on the forward ends of the exit end surfaces are adjusted so that the members are on the same level, whereby the plural exit end surfaces arranged in a matrix define a single plane exit surface.

A number of light guide devices are disposed in a matrix in a number of pinhole-shaped openings formed in the surface of the reflection box containing the parallel plural linear light sources, whereby the plural exit end surfaces arranged in a matrix define the single plane exit surface without the use of light guide members.

The liquid crystal display device has the small-sized light source device which can emit highly directive light beams at high efficiency, whereby the liquid crystal display device can be small in size and can display at very high luminance of above ten thousands $cd/m^2$. Such liquid crystal display device is applicable to outdoor display boards, display boards which have to be looked from a distance, etc.

The light diffusing sheet 92 is provided on the liquid crystal panel 86, whereby directive beams which have exited the light guide devices 10 and passed through the liquid crystal panel are diffused, whereby the liquid crystal display device can be free from color tone changes depending on visual angles over a wide field angle.

As a result, in the light source device for use in image forming optical systems, such as liquid crystal display devices, which requires light rays of high directivity with high efficiency, the light source is not limited to halogen lamps, metal halide lamps or others, and diffusing light sources of long lifetimes, such as fluorescent lamps, can be used. In the light source device using conventional a substantial point light sources, improved directivity and lower electric power consumption can be achieved. Since the light guide device itself is small, the light source device can be small in size further more, the liquid crystal display device containing the light source device can also small in size.

BRIEF DESCRIPTION OF THE DRAWINGS

FIGS. 1A and 1B are a perspective view and a schematic sectional view of the light guide device according to a first embodiment of the present invention.

FIG. 11 is schematic sectional view of the light source device according to an eighth embodiment of the present invention.

DETAILED DESCRIPTION OF THE INVENTION

Figure 2A:
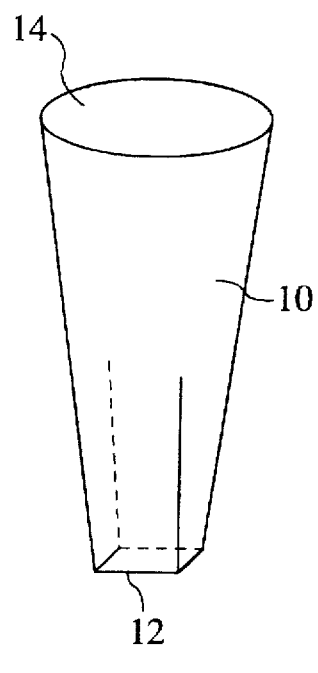
FIGS. 2A and 2B are perspective views of variations of the light guide device of FIG. 1A.

The present invention will be explained by means of embodiments.

FIG.1A is a perspective view of the light guide device according to a first embodiment of the present invention. FIG. 1B is a sectional view of the light guide device of FIG. 1A.

A light guide device 10 is a cylindrical transparent body of, e.g., acrylic resin. One of two parallel end surfaces with each other is an incident end surface having a smaller area and a 1 mm-diameter, and the other is an exit end surface having a larger area and a 6.2 mm-diameter. The length of the light guide device 10 is 100 mm.

A method for providing high directivity by the use of this light guide device will be explained.

As shown in FIG. 1B, when diffused light 16 from a set light source enters the light guide device 10 at an arbitrary angle at the incident end surface 12 thereof, the light which has entered the light guide device 10 arrives at the boundary surface thereof.

Because the light guide device 10 is a cylindrical transparent body of acrylic resin, the light enters the light guide device 10 is condensed within a critical angle of the transparent body to be totally reflected in accordance with Snell's law determined by a refractive index ratio between the light guide device 10 and an outer circumferential space. The totally reflected light arrives at the opposed boundary surface to be again reflected in accordance with the law of total reflection.

Because the light guide body 10 is gradually diverged from the incident end surface 12 toward the exit end surface 14, this reflection is repeated, whereby the reflected light gradually changes into light rays vertical to the incident end surface 12 or the exit end surface 14. Thus finally highly directive light rays 18 of an about ±10° directivity exit at the exit end surface 14. Since the light which has entered the light guide device 10 repeats only total reflection, most of the incident light becomes exit light rays with high efficiency.

Thus, according to the first embodiment, the cylindrical transparent light guide device 10 is used, and light is incident on the smaller-area incident end surface 12, whereby even the incident light is diffused light, highly directive light rays 18 can exit at the exit end surface 14 with high efficiency.

In the first embodiment the light guide device 10 is a transparent cylindrical body but it is not limited to this shape. The light guide device 10 may be, as exemplified in FIG. 2A, generally cylindrical and a square pole only near the incident end surface 12. As shown in FIG. 2B, the light guide device 10 may be a hexagonal pole only near the exit end surface 14. Although not shown, the light guide device 10 may be generally a polygonal pole.

Thus variations of the light guide device 10 can be proposed, and an optimum shape may be selected so that maximum incidence efficiency can be provided in optical coupling when the light guide device is combined with other optical systems to constitute a light source device.

Figure 3:
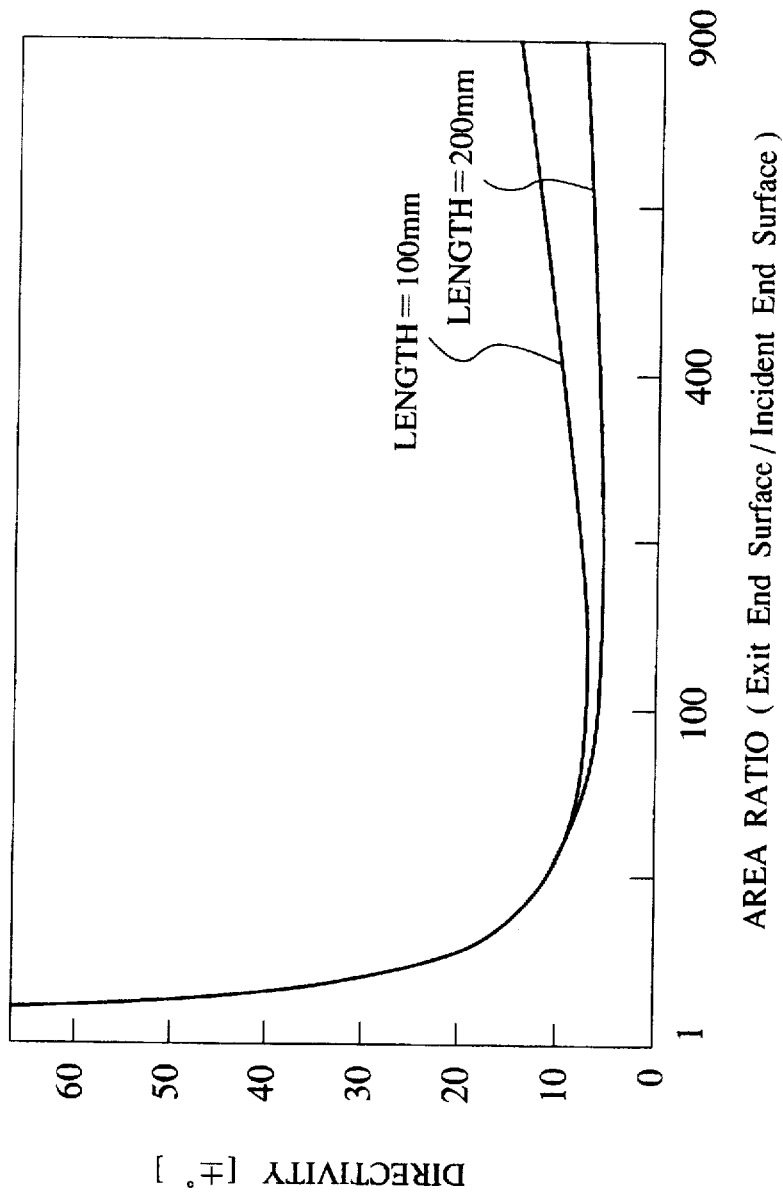
FIG. 3 is characteristic curves of relationships between shapes of the light guide device of FIG. 1 and directivity of the exit light rays.

Next, FIG. 3 shows characteristic curves explaining the relationships between the shape of the light guide device 10 of FIG. 1 and directivity of the directive light rays 18.

As apparent from the characteristic curves, as an area ratio between the exit end surface 14 of the light guide device 10 and the incident end surface 12 is increased, directivity of the directive light rays 18 is sharply improved. The rise of the directivity is saturated around at an area ratio of 100. When an area ratio exceeds 100, the directivity tends to be oppositely decreased a little.

Accordingly an optimum shape of the light guide device 10, especially an area ratio between the exit end surface 14 and the incident end surface 12 is selected for a required directivity on the characteristic curves of FIG. 3. The directivity of the exit light rays can be improved up to the practical level by setting an area of the exit end surface 14 at 3 or more for an area 1 of the incident end surface 12.

Then the light source device according to a second embodiment of the present invention will be explained with reference to FIG. 4.

Figure 4:
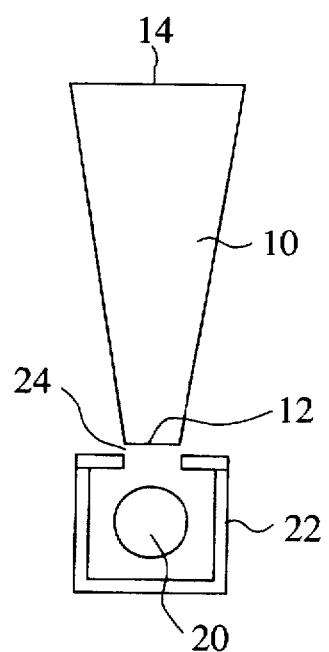
FIG. 4 is a schematic sectional view of the light source device according to a second embodiment of the present invention.

FIG. 4 shows a schematic sectional view of the light source device according to the second embodiment.

A substantial point light source 20, e.g., a metal halide lamp, is contained in a reflection box 22 having the inside wall covered with, e.g., a silver reflecting surface. An opening 24 in the form of a pinhole is formed in a surface of the reflecting box 22.

In the opening 24 in the form of an pinhole the light guide device 10 of FIG. 1 is disposed with the incident end surface 12 opposed to the substantial point light source 20 in the reflecting box 22. It is preferable that a shape of the opening 24 in the form of a pinhole agrees with a shape of the incident end surface 12 of the light guide device 10.

Next, the operation of the light source device of FIG. 4 will be explained.

Light emitted from the substantial point light source 20 repeats reflection on the silver reflecting surface on the inside wall of the reflection box 22 and finally exits through the opening 24 in the form of a pinhole to be incident on the incident end surface of the light guide device 10. As described above, the light which has entered the light guide device 10 exits at the exit end surface 14 in directive light rays of directivity as high as ±10°.

Thus in the light source device according to the second embodiment using the light guide device 10 according to the first embodiment, optical coupling between the incident end surface 12 of the light guide device 10 and the substantial point light source 20 through the opening 24 in the form of a pinhole can realize a light source device which can emit highly directive light rays with high efficiency.

Then the light source device according to a third embodiment of the present invention will be explained with reference to FIG. 5.

Figure 5A:
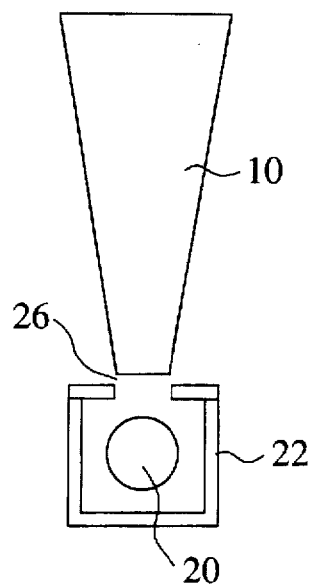
FIGS. 5A and 5B are schematic sectional views of the light source device according to a third embodiment of the present invention.
Figure 5B:
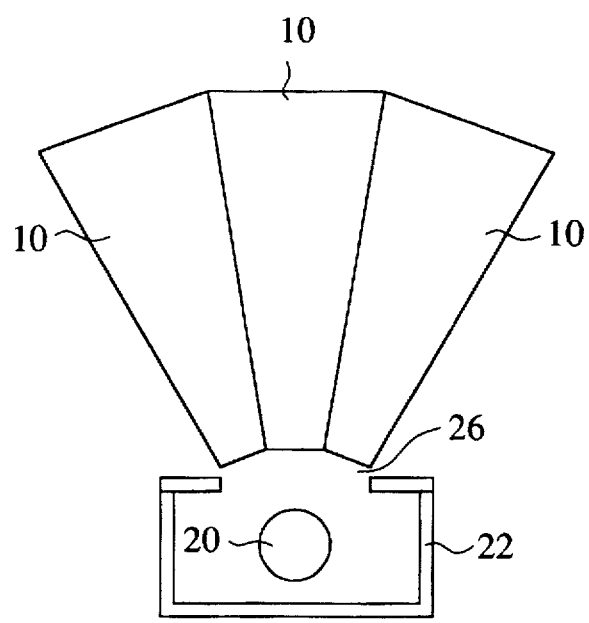

FIG. 5A is a sectional front view of the light source device according to the third embodiment. FIG. 5B is a sectional side view of the light source device according to the third embodiment. Common members of the light source device according to the third embodiment with that of FIG. 4 have common reference numerals not to repeat their explanation.

The light source device according to this embodiment is characterized in that the opening 24 in the form of a pinhole of the second embodiment is replaced by an opening in the form of a slit, and a plurality of light guide devices are disposed in the opening in the form of a slit.

That is, the opening 26 in the form of a slit is formed in a surface of a reflection box 22 containing a substantial point light source 20. The opening 26 in the form of a slit has a width equal to a size of the incident end surface of each light guide device 10 and a length some times the size. In the opening 26 in the form of a slit a plurality of the light guide devices 10 are disposed adjacent to each other in a fan-shape along the slit with the incident end surfaces 12 opposed to the substantial point light source 20 in the reflection box 22.

Next the operation of the light source device of FIG. 5 will be explained.

Light emitted from the substantial point light source 20 repeats reflection on a silver reflection surface on the inside surface of the reflection box 22 as in the second embodiment, and exits through the opening 26 in the form of a slit. The opening 26 in the form of a slit, which is larger than the opening 24 in the form of a pinhole, facilitates the exit of the light source light. That is, reduction of times of the reflection within the reflection box 22 decreases light absorption by the silver reflecting surface. The efficiency of incidence of the light on the incident end surfaces 12 of the plural light guide devices 10 is accordingly improved. The light which has entered the plural light guide devices 10 exit at the plural exit end surfaces 14 in directive light rays respectively of high directivity of ±10°.

Thus in the light source device according to the third embodiment using the light guide device 10 according to the first embodiment, a substantial point light source 20, and the incident end surfaces 12 of a plurality of the light guide devices 10 are optically coupled to each other through the opening 26 in the form of a slit, whereby a plurality of light rays of high directivity can exit with high efficiency.

Next the light source device according to a fourth embodiment of the present invention will be explained with reference to FIG. 6.

Figure 6:
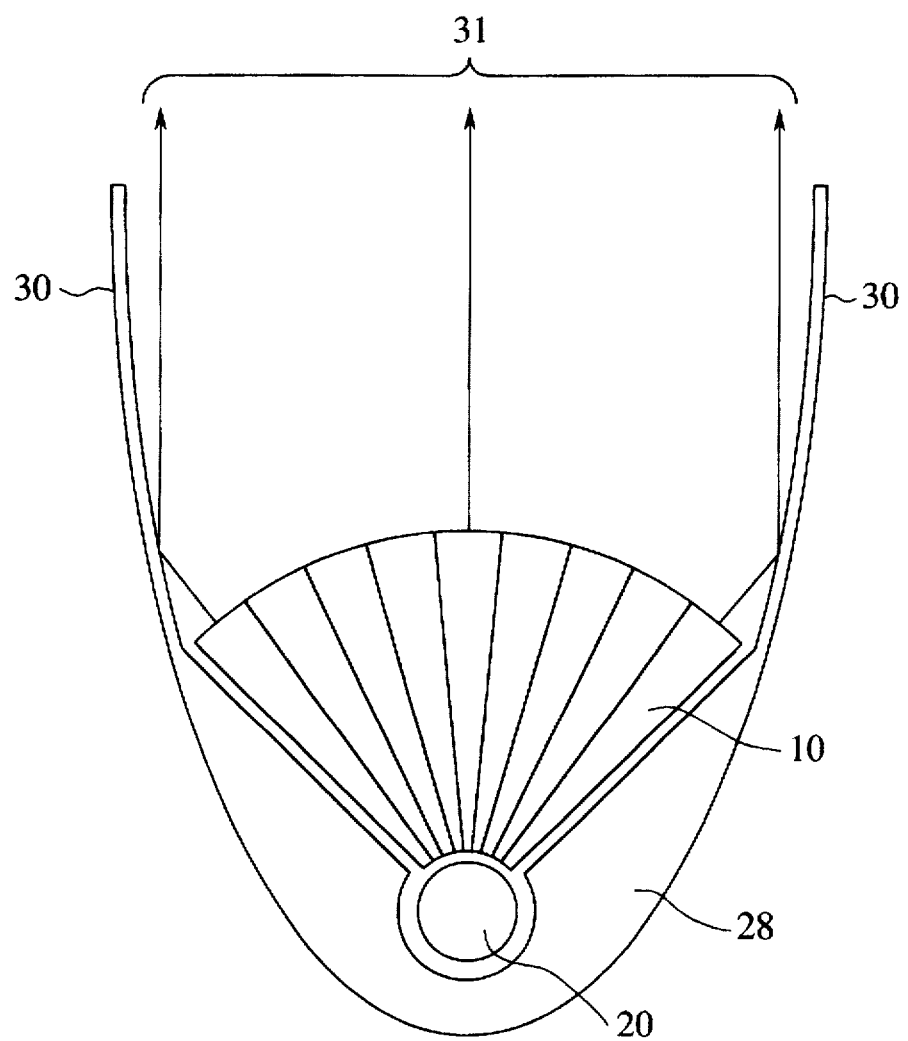
FIG. 6 is a schematic sectional view of the light source device according to a fourth embodiment of the present invention.

FIG. 6 is a schematic sectional view of the light source device according to the fourth embodiment of the present invention. Common members of the light source device according to the fourth embodiment with that of FIG. 5 have common reference numerals not to repeat their explanation.

The light source device according to this embodiment is characterized in that a reflecting mirror is disposed outside the light source device according to the fourth embodiment.

An opening in the form of a slit is formed in a surface of a reflection box 28 containing a substantial point light source 20, and a plurality of the light guide devices 10 are arranged adjacent to each other in a fan-shape along the slit. The reflecting mirror 30 which is extended beyond the exit end surfaces 14 of the light guide devices 10 are formed in one-piece with each other.

Then the operation of the light source device of FIG. 6 will be explained.

Light emitted from the substantial point light source 20 is condensed in the opening in the form of a slit by the reflection box 28 to enter the incident end surfaces 12 of the plural light guide devices 10, and exits at the plural exit end surfaces 14 as highly directive rays respectively of about ±10°. These exit rays respectively have high directivity but are very divergent in the direction of propagation of their principal rays.

But exit light rays which are very divergent in the direction of propagation of the principal rays are reflected on the reflecting mirror 30 into substantially parallel rays 31, because the reflecting mirror 30 extended beyond the exit end surfaces 14 of the light guide devices 10 has surface angles suitably set at parts thereof.

In the light source device according to the fourth embodiment using the light guide devices 10 according to the first embodiment, the incident end surfaces 12 of a plurality of light guide devices 10 and the substantial point light source 20 are optically coupled to each other through the opening 26 in the form of a slit, and the reflecting mirror 30 is provided for reflecting the exit light rays from the exit end surfaces 14, whereby substantial parallel rays 31 of high directivity can be emitted with high efficiency. The presence of the reflecting mirror 30 allows the light source device itself to be small-sized because the light guide device 10 is sufficiently small.

In the fourth embodiment, exit light rays of high directivity whose principal light rays are very divergent are formed into substantial parallel rays 31 by the reflecting mirror 30. But in the case that the principal light rays from the plural exit end surfaces 14 are relatively less divergent, assistant members 32 in the form of prisms provided by transparent bodies in various shapes as shown in FIG. 7 may be disposed, in place of the reflecting mirror 30, on the forward ends of the exit end surfaces 14 of the respective light guide devices 10.

Figure 7:
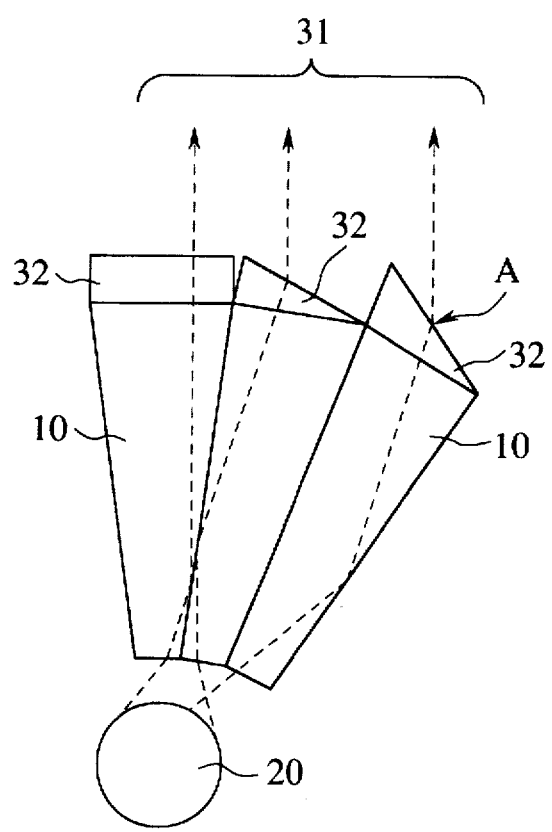
FIG. 7 is a schematic sectional view of a variation of the light source device of FIG. 6.

That is, in the case that the principal exit light rays are too divergent, and the exit principal light rays from those of the light guide devices 10 on the ends are largely inclined, the exit light rays are totally reflected at diffraction points, e.g., at the point A in FIG. 7, in directions where they are made ineffective. But in the case that the principal light rays are relatively less divergent, the assistant members 32 in the form of a prism of a triangle pole or rectangular pole selected in accordance with inclinations of the principal exit light rays are provided on the forward ends of the exit end surfaces 14 of the respective light guide devices 10, whereby directions of the principal exit light rays of the exit light rays from the exit end surfaces 14 of the respective light guide devices 10 can be corrected to be substantially parallel rays 31.

Then the light source device according to a fifth embodiment of the present invention will be explained with reference to FIG. 8.

Figure 8:
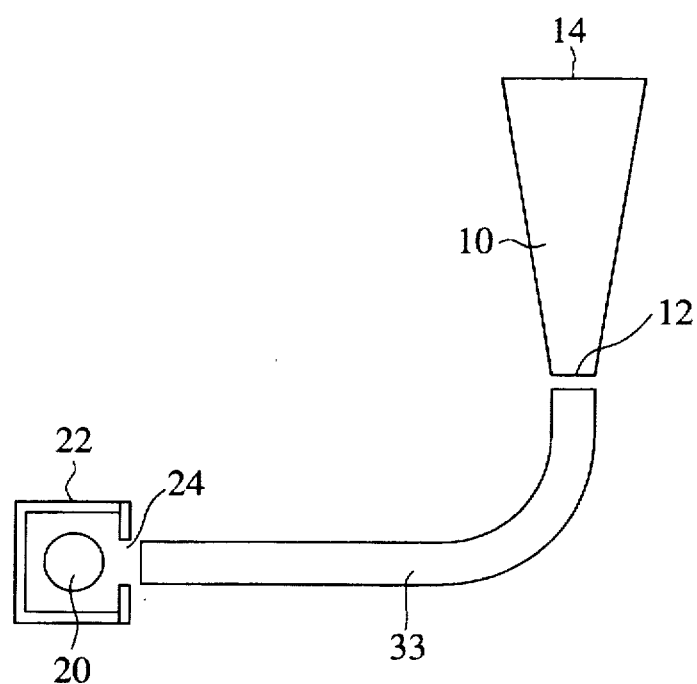
FIG. 8 is a schematic sectional view of the light source device according to a fifth embodiment of the present invention.

FIG. 8 is a schematic sectional view of the light source device according to the fifth embodiment. Common members of the fifth embodiment with the light source device of FIG. 4 have common reference numerals not to repeat their explanation.

The light source device according to the fifth embodiment is characterized in that a flexible optical fiber is disposed, as a light guide component, between the opening 24 in the form of a pinhole of the light source device according to the above-described second embodiment, and the incident end surface 12 of the light guide device 10, which optically couples both members 24, 10.

That is, the optical fiber 33 as a light guide component is disposed between the pinhole-shaped opening 24 and the incident end surface 12 of the light guide device 10 to optically couple with each other. The optical fiber 33 is flexed, or a length of the optical fiber 33 is shortened or elongated, whereby an optimum positional relationship between the light guide device 10 and a substantial point light source 20 can be set as required.

Thus, in the light source device according to the fifth embodiment using the light guide device 10 according to the first embodiment, the optical fiber 33 as a light guide component which optically couples the incident end surface 12 of the light guide device 10 with the substantial point light source 20, and a length and flexure of which are adjustable is disposed, whereby light rays of high directivity can be emitted with high efficiency in a prescribed direction at a prescribed position distant from the substantial point light source 20.

Then the light source device according to a sixth embodiment of the present invention will be explained with reference to FIG. 9.

Figure 9A:
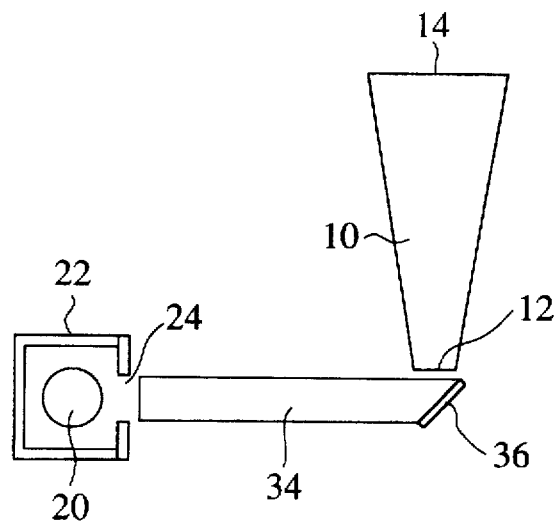
FIGS. 9A and 9B are schematic sectional views of the light source device according to the sixth embodiment of the present invention.
Figure 9B:
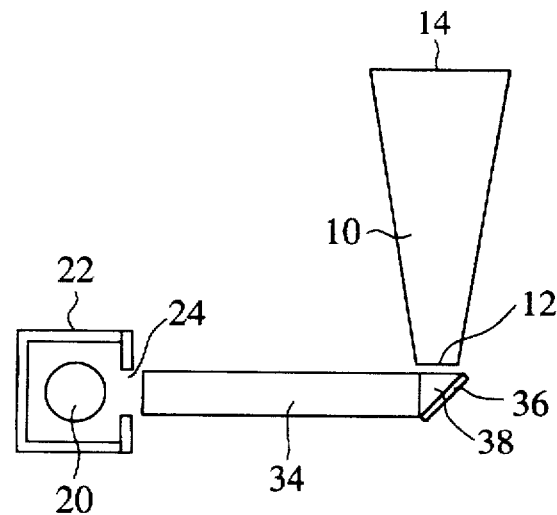

FIG. 9A shows a schematic sectional view of the light source device according to the sixth embodiment, and FIG. 9B shows a schematic sectional view of a variation of the sixth embodiment. Common members of the light source device according to this embodiment with the light source device of FIG. 8 are represented by common reference numerals not to repeat their explanation.

The light source device according to this embodiment is characterized by the use of a rectangular shaped-light guide member as a light guide component in place of the optical fiber 33 of the light source device according to the fifth embodiment.

That is, the rectangular pole-shaped light guide member 34 contacts an opening 24 in the shape of a pinhole on one end surface, and has the other end surface formed in a slant surface of an about 45° point angle on which an Al reflecting surface 36 is formed by, e.g., Al evaporation so that light passing through the rectangular pole-shaped light guide member 34 is normally reflected. Above the Al reflecting surface 36 there is disposed the light guide device 10 with the incident end surface 12 opposed to the Al reflecting surface 36. Thus a substantial point light source 20 and the incident end surface 12 of the light guide device 10 are optically coupled with each other.

A length of the rectangular pole-shaped light guide member 34 is shortened or elongated, whereby a positional relationship between the light guide device 10 and the substantial point light source 20 can be varied within a range which is not so wide as that provided by the optical fiber 33.

In the light source device according to the sixth embodiment using the light guide device 10 according to the first embodiment, the rectangular pole-shaped light guide member 34 is disposed as a light guide component for optically coupling the incident end surface 12 of the light guide device 10 with the substantial point light source 20, and a length, etc. of the light guide member are adjusted, whereby light rays of high directivity can be emitted from a set position distant from the substantial point light source 20 with high efficiency.

Thus, in the light source device according to the sixth embodiment using the light guide device 10 according to the first embodiment, the rectangular pole-shaped light guide member 34 as a light guide component which optically couples the incident end surface 12 of the light guide device 10 with the substantial point light source 20, and a length of which are adjustable is disposed, whereby light rays of high directivity can be emitted with high efficiency in a prescribed direction at a prescribed position distant from the substantial point light source 20.

As shown in FIG. 9A, the Al reflecting surface 36 is provided on the slant surface on the forward end to change a direction of light transmitted the rectangular pole-shape light guide member 34, but in place of the Al reflecting surface 36 a right angle prism 38 having an Al reflecting surface 36 formed on the slant surface by Al evaporation may be provided on the end surface of the rectangular pole-shaped light guide member 34. The experiment conducted by the inventors of the present invention shows that the case of FIG. 9B where the right angle prisms 38 with the Al reflecting surface 36 on the slant surface is provided on the forward end surface of the rectangular pole-shaped light guide member 34 could provide exit light rays with high efficiency than the case of FIG. 9A where the Al reflecting surface 36 is formed on the slant surface on the forward end of the rectangular pole-shaped light guide member 34.

Figure 2B:
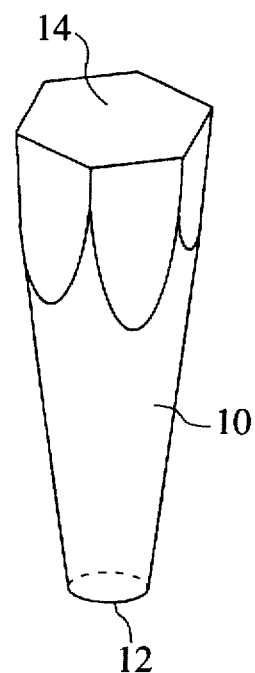

In these cases, taking into consideration optical coupling of the rectangular pole-shaped light guide member 34 with the right angle prism 38 it is preferable that the light guide device 10 has a rectangular pole shape only near the incident end surface as shown in FIG. 2A.

The light source device according to a seventh embodiment of the present invention will be explained with reference to FIG. 10.

Figure 10A:
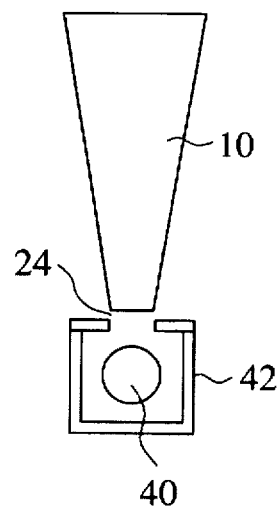
FIGS. 10A and 10B are schematic sectional views of the light source device according to a seventh embodiment of the present invention.
Figure 10B:
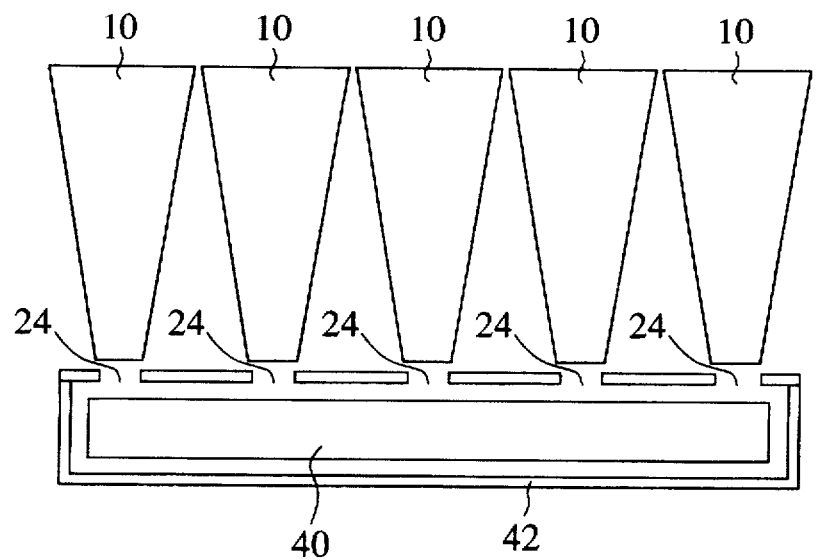

FIG. 10A is a front sectional view of the light source device according to the seventh embodiment, and FIG. 10B is a side sectional view thereof. Common members of the light source device according to this embodiment with that of FIG. 4 are represented by common reference numerals not to repeat their explanation.

The light source device according to the seventh embodiment is characterized in that a linear light source is used in place of the substantial point light source 20 of the second embodiment, and a plurality of openings in the shape of a pinhole are arranged along the linear light source.

That is, the linear light source 40 in the form of a fluorescence tube is contained in a reflection box 42 having the inside wall coated with a silver reflecting surface. A plurality of openings 24 in the shape of a pinhole are formed at a certain interval in a surface of the reflection box 42 along the linear light source 40.

Light guide devices 10 are disposed respectively in the plural pinhole-shaped openings 24 with the incident end surfaces 12 opposed to the linear light source 20 in the reflection box. Accordingly a plural number of the exit end surfaces 14 of the plural light guide devices 10 are arranged linearly on a set level. Light rays of high directivity are emitted with high efficiency from the respective plural exit end surfaces 14 linearly arranged.

In the light source device according to the seventh embodiment using the light guide devices 10 of the first embodiment, the linear light source 40 is used as the light source, and the incident end surfaces 12 of the plural light guide devices 10 and the linear light source 40 are optically coupled with each other through the plural pinhole-shaped openings 24 formed along the linear light source 40, whereby light rays of high directivity can be emitted with high efficiency from the plural end surfaces 14 arranged linearly on a set level.

In place of the plural pinhole-shaped openings 24 in the seventh embodiment, a plurality of the openings in the shape of a slit may be opened normal to the linear light source 40 and at a set interval along the linear light source 40.

In this case a plurality of light guide devices 10 are disposed adjacent to each other in each of the slit-shaped opening 26, and in addition a plurality of light guide devices 10 are disposed along the linear light source 40, so that a plurality of the exit end surfaces 14 of the light guide devices 10 are arranged in a matrix. Light rays of high directivity are emitted with high efficiency from the respective plural exit end surfaces 14 arranged in a matrix.

But although the exit light rays from the plural exit end surfaces 14 arranged in a matrix respectively have high directivity, their primary light rays are widely diverged, and it is preferable to dispose a reflecting mirror on the outside of the light source device to convert the light rays into substantially parallel rays, as is done in the fourth embodiment.

Then the light source device according to an eighth embodiment of the present invention will be explained with reference to FIG. 11.

FIG. 11 is a schematic sectional view of the light source device according to the eighth embodiment of the present invention. Common members of the light source device according to this embodiment with the light source devices of FIGS. 8 and 10 are represented by common reference numerals not to repeat their explanation.

The light source device according to the eighth embodiment is characterized in that an opening in the shape of a stripe is formed in place of a plurality of pinhole-shaped openings 24 of the seventh embodiment, and a plurality of bundles of the optical fibers 33 as light guide members of the fifth embodiment are arranged between the stripe-shaped opening and the incident end surfaces 12 of a plurality of the light guide devices 10.

That is, the stripe-shaped opening 44 is formed in a surface of a reflection box 42 containing a linear light source 40 in the same direction of the linear light source 40. The stripe-shaped opening 44 has a width some times a size of the incident end surfaces 12 of the light guide devices 10 and is extended along the linear light source 40 depthwise of the drawing.

The main cause for lowering efficiency of source light emission from the reflection box is increases in light absorption which take place due to multiple reflection in the reflection box when the source light reflects on the reflecting mirror. The stripe-shaped opening 44 structurally has a larger opening, so that the source light has less reflecting times within the reflection box 42, which facilitates the emission of the source light out of the reflection box 42 more than through the pinhole-shaped openings 24 and the slit-shaped openings 26. Accordingly higher efficiency and higher luminance can be provided.

A plurality of bundles of the optical fiber 33 are disposed in the stripe-shaped opening 44 and optically couple the stripe-shaped opening 44 and the incident end surfaces 12 of the plural light guide devices 10. The respective optical fibers of each bundle are adjusted in terms of elongation and flexure so that the exit end surfaces 14 of the plural light guide devices 10 are arranged in a matrix, and the exit end surfaces 14 are on a set level. In other words, the plural exit end surfaces 14 in the matrix define a single plane exit surface 46.

In the light source device according to the eighth embodiment using the light guide devices according to the first embodiment, the stripe-shaped opening 44 with a large opening area is used, whereby light rays of directivity can be more efficiently emitted from the exit end surfaces 14 and can have higher luminance, while the respective optical fibers 33 optically coupling the linear light source 40 and the plural light guide devices 10 are adjusted in terms of elongation and flexure, whereby the plural exit end surfaces 14 arranged in a matrix can define a single plane exit surface 46.

In this case, to arrange the exit end surfaces 14 in a matrix without any gap between each of the exit end surfaces and its adjacent one, it is preferable that each light guide device 10 has a hexagonal shape or a rectangular shape only near the incident end surface 12.

The light source device according to a ninth embodiment of the present invention will be explained with reference to FIGS. 12 and 13.

Figure 12:
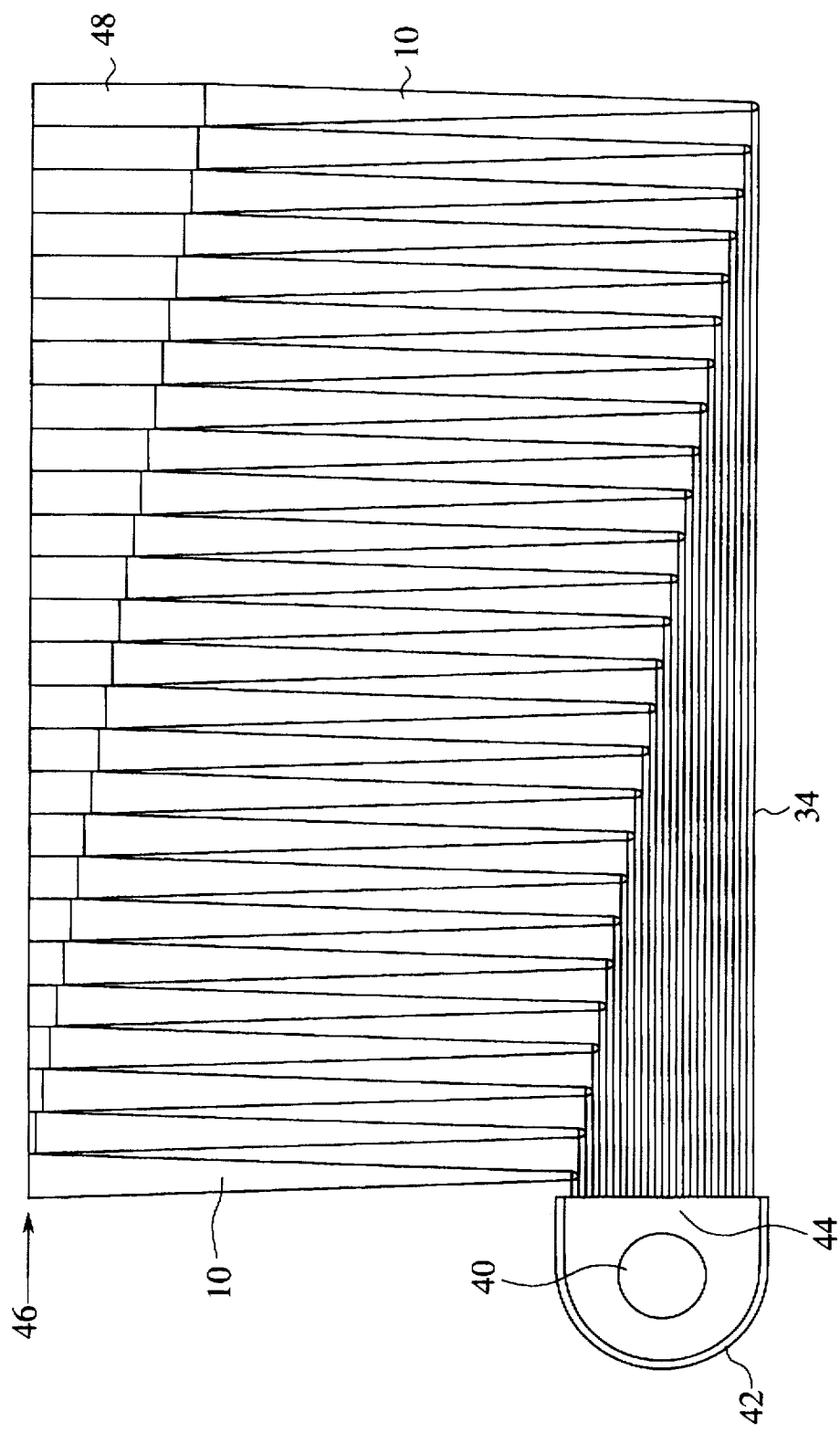
FIG. 12 is a schematic sectional view of the light source device according to a ninth embodiment of the present invention.
Figure 13A:
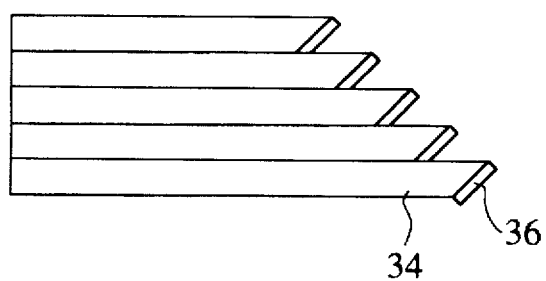
FIGS. 13A to 13D are views of a rectangular pole-shaped light guide member of the light guide device of FIG. 12, and of its variations.
Figure 13B:
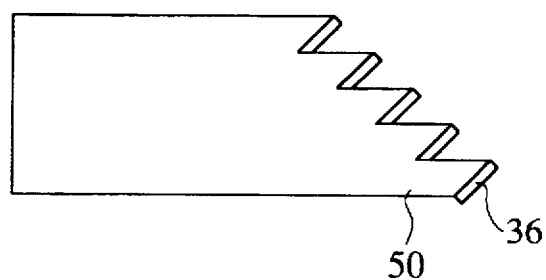
Figure 13C:
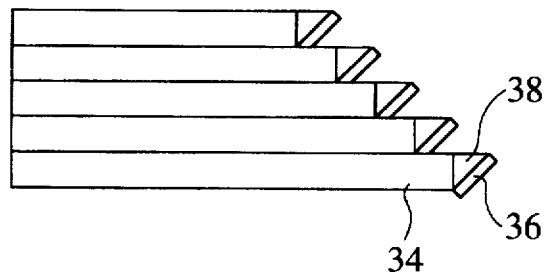
Figure 13D:
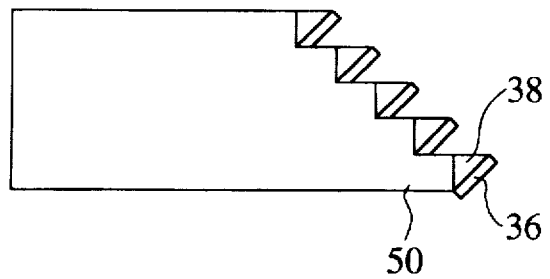

FIG. 12 is a schematic sectional view of the light source device according to the ninth embodiment. FIG. 13A is a partial enlarged view of a rectangular pole light guide member of the light guide device, and FIGS. 13B to D are variations of the rectangular pole light guide member. Common members of the ninth embodiment with the light source devices of FIGS. 9 and 11 are represented by common reference numerals not to repeat their explanation.

The light source device according to the this embodiment is characterized in that a plurality of the rectangular pole light guide members 34 of the fifth embodiment are arranged in place of the optical fibers 33 of the eighth embodiment.

That is, a plurality of the rectangular pole light guide members 34 are arranged adjacent to each other without any gap between each of the light guide members 34 and its adjacent one in a stripe-shaped opening 44 formed in a surface of a reflection box 42 containing a linear light source 40 normal to the linear light source 40.

As shown in FIG. 13A, the Al reflecting surface 36 of FIG. 9A is formed on an about 45°-slant surface on the forward end of each of the rectangular pole light guide members 36. Light from the linear light source 40 through the rectangular pole light guide members 34 reflects on the Al reflecting surfaces 36 to be incident on the incident end surfaces of a plurality of the light guide devices 10 arranged above the Al reflecting surfaces 36. The rectangular pole light guide member 34 are respectively adjusted in terms of length, so that the exit end surfaces 14 of the plural light guide devices 10 are arranged in a matrix.

A transparent assistant member 48 in the shape of a pole is provided on the forward end of the exit end surface 14 of each light guide device 10. The assistant members 48 are adjusted in terms of length to be on the same level so as to define a single plane exit surface 46.

In the light source device according to the ninth embodiment of the present invention using the light guide devices 10 of the first embodiment, the stripe-shaped opening 44 is used, the linear light source 40 and the incident end surfaces 12 of the plural light guide devices 10 are optically coupled with each other by the rectangular pole light guide members 34, while lengths of the pole-shaped assistant members 48 on the forward ends of the exit end surfaces 14 are adjusted so that the members 48 are on the same level, whereby, as is in the eighth embodiment, the plural exit end surfaces 14 arranged in a matrix define a single plane exit surface 46.

In the ninth embodiment, in place of a plurality of rectangular pole-shaped light guide members 34 arranged adjacent to each other without any gap in FIG. 13A, a light guide member 50 having the rectangular pole-shaped light guide members 34 formed in one-piece in FIG. 13B may be used. In this case as well, it is necessary that the forward ends of the light guide member 50 optically coupled with the incident end surfaces 12 of the plural light guide devices 10 are formed in about 45° slant surfaces on which Al reflecting surfaces 36 are respectively.

As shown in FIG. 13C, the right angle prisms 38 having the Al reflecting surfaces 36 on the slant surfaces in FIG. 9B may be disposed on the forward surfaces of the rectangular pole-shaped light guide members 36 in place of the Al reflecting surfaces 36 on the forward slant surfaces of the rectangular pole-shaped light guide members 36 in FIG. 13A.

As shown in FIG. 13D, in place of the plural rectangular pole-shaped light guide members 34 disposed adjacent to each other without any gap therebetween in FIG. 13C, a light guide member 50 with the rectangular pole-shaped light guide members 34 formed in one-piece may be used. In this case as well, it is necessary that right angle prisms 38 respectively with the Al reflecting surfaces 36 formed on the slant surfaces are disposed on the forward surfaces optically coupled with the incident end surfaces of the plural light guide devices 10.

Then the light source device according to a tenth embodiment of the present invention will be explained with reference to FIG. 14.

Figure 14:
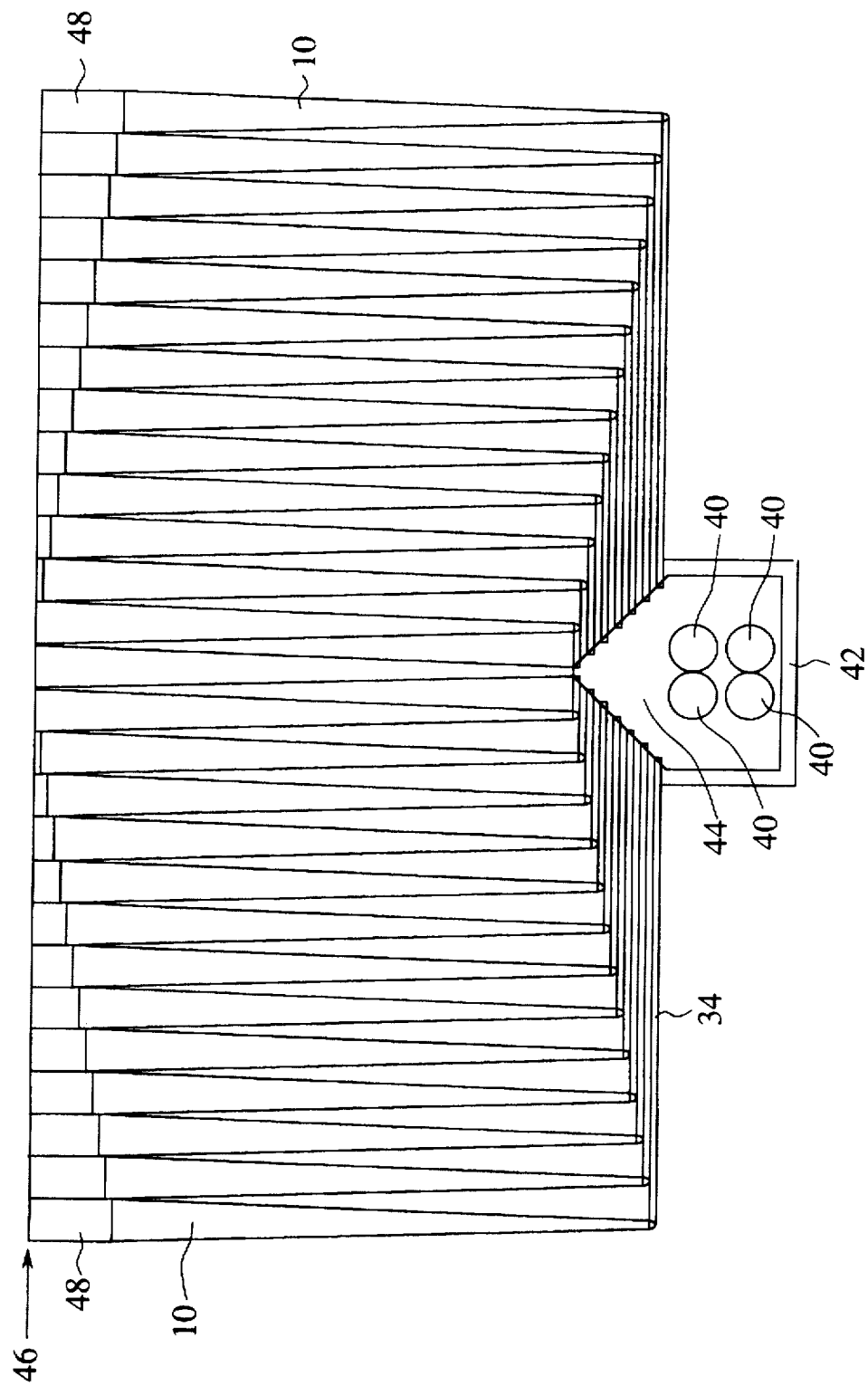
FIG. 14 is a schematic sectional view of the light source device according to a tenth embodiment of the present invention.

FIG. 14 is a schematic sectional view of a light source device according to the tenth embodiment. Common members of the light source device according to this embodiment with that of FIG. 12 are represented by common reference numerals not to repeat their explanation.

In the ninth embodiment the plural rectangular pole-shaped light guide members 34 are extended in one direction from the stripe-shaped opening 44, but in this embodiment rectangular pole-shaped light guide members 34 are extended in two directions from a stripe-shaped opening 44. This is characteristic of this embodiment.

That is, a plurality of linear light sources 40 are contained in a reflection box 42. This is intended to raise luminance of source light to increase luminance of exit light rays. A plurality of rectangular pole-shaped light guide members 34 are arranged in two directions normal to the stripe of the stripe shaped opening 44 formed in a surface of a reflection box 42 from the opening 44.

On both end surfaces of each rectangular pole-shaped light guide member 36 there are provided right angle prisms 38 having the Al reflecting surfaces 36 of, e.g., FIG. 13C provided on a slant surface, so that light from the linear light source 40 which has passed through the rectangular pole-shaped light guide member 34 is incident on the incident end surfaces 12 of the light guide devices 10 arranged above the right angle prisms 38.

As in the ninth embodiment, the respective rectangular pole-shaped light guide members 34 are adjusted in terms of length, so that the exit end surfaces 14 of the plural light guide devices 10 are arranged in a matrix.

As in the ninth embodiment, assistant members 48 in the form of transparent poles are disposed on the forward portions of the exit end surfaces 14 of the light guide devices 10 and are adjusted to have set lengths, so that the pole-shaped assistant members 48 are on a set level and define a single plane exit surface 46.

In the light source device according to the tenth embodiment of the present invention using the light guide devices 10 of the first embodiment, the plural rectangular pole-shaped light guide members 34 are arranged even in two directions from the stripe-shaped opening 44, but the light source device can still achieve the same advantageous effects as the ninth embodiment. In this case, since the reflection box 42 containing the plural linear light sources 40 is disposed below the plural light guide devices 10, the reflection box 42 can be invisibly hid behind the plural light guide devices 10 as viewed on the side of the exit surface 46. That is, the light source device has an advantage that the device as a whole can be diminished in size in the surroundings as the non-light emitting part.

In the ninth and the tenth embodiments, taking into consideration that the pole-shaped assistant members 48 arranged in a matrix to define the single exit surface 46 it is preferable that the pole-shaped assistant members 48 are hexagonal pole-shaped or rectangular pole-shaped at least near the exit end surfaces 46.

The light source device according to an eleventh embodiment of the present invention will be explained with reference to FIG. 15.

Figure 15:
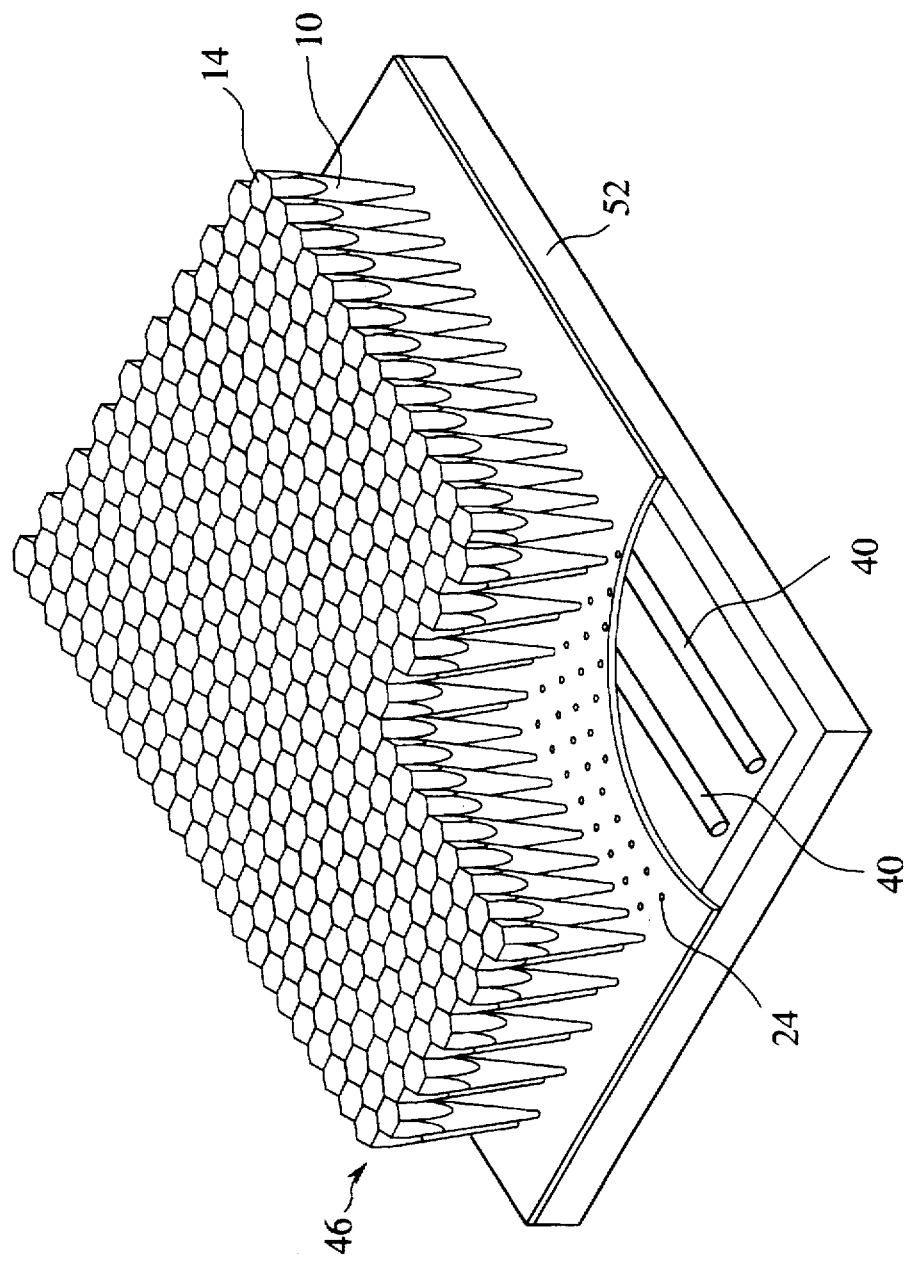
FIG. 15 is a perspective view of the light source device according to an eleventh embodiment of the present invention.

FIG. 15 is a perspective view of the light source device according to the eleventh embodiment. Common members of the light source device according to this embodiment with that of FIG. 10 are presented by common reference numerals not to repeat their explanation.

The light source device according to this embodiment is characterized in that the pinhole-shaped openings 24 of the seventh embodiment, which are linearly formed, are formed in matrix.

That is, a plurality of parallel lines of light sources 40 are contained in a reflection box 52 having the inside wall coated with a silver reflecting surface. A number of pinhole-shaped openings 24 are formed in a surface of the reflection box 52. In the respective pinhole-shaped openings 24 there are disposed light guide devices 10 with the incident end surfaces 12 opposed to a linear light source 40 in the reflection box 52. The exit end surfaces 14 of the plural light guide devices 10 are on the same level to define a single plane exit surface 46.

The light guide devices 10 are, as shown in FIG. 2B, hexagonal near the exit end surfaces 14, and the exit end surfaces 14 defining the exit surface 46 are arranged in a matrix without any gap therebetween.

In the light source device according to the eleventh embodiment of the present invention using the light guide devices 10 of the first embodiment, a number of light guide devices 10 are disposed in a matrix in a number of pinhole-shaped openings 24 formed in the surface of the reflection box 52 containing the parallel plural linear light sources, whereby the plural exit end surfaces 14 arranged in a matrix define the single plane exit surface 46 without the use of light guide members.

Figure 16:
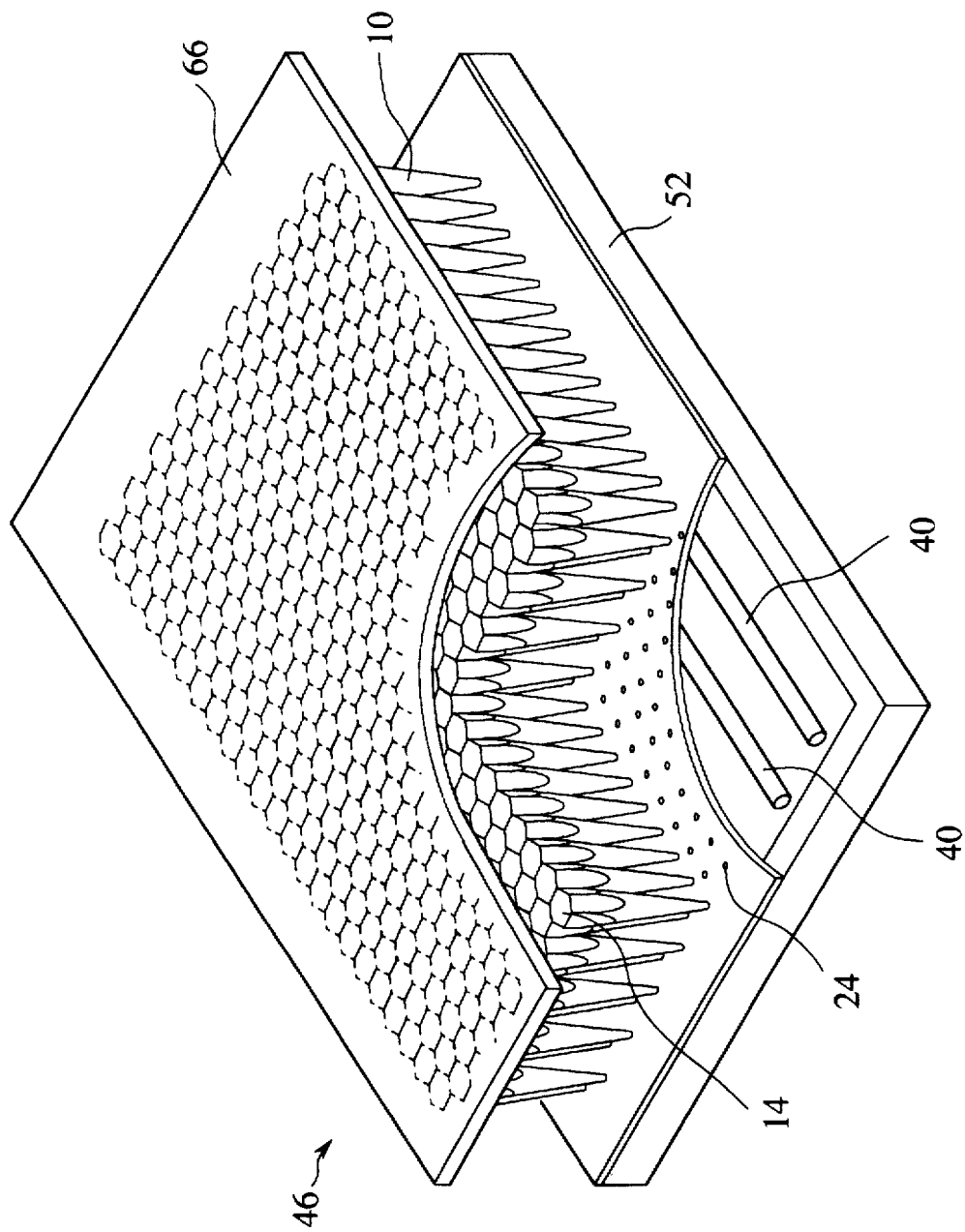
FIG. 16 is a perspective view of the light source device according to a twelfth embodiment of the present invention.
Figure 17:
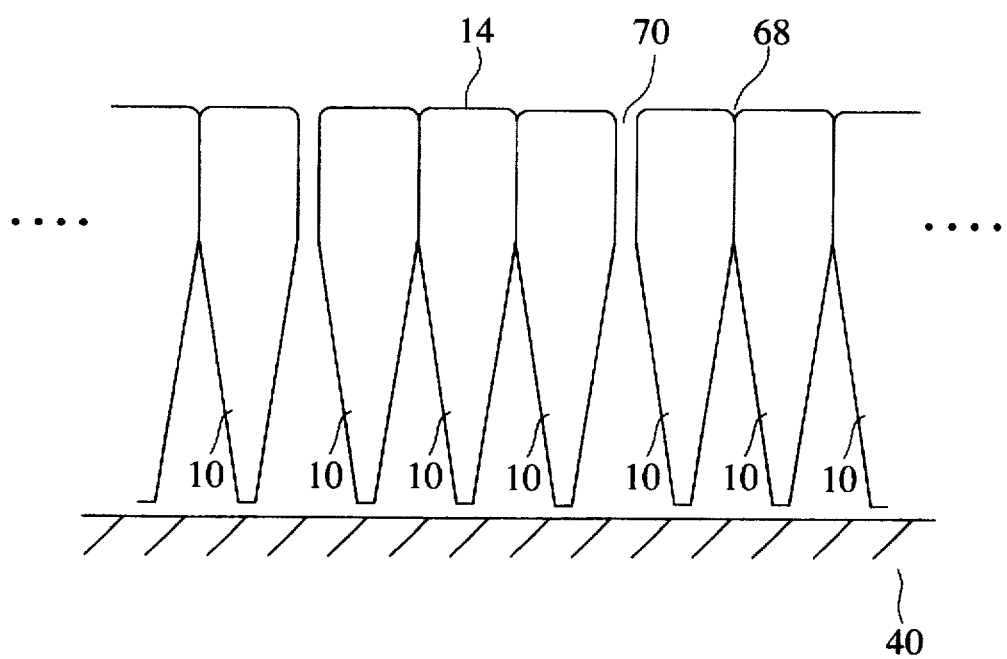
FIG. 17 is a partially enlarged sectional view of the light source device according to the eleventh embodiment of the present invention.

Next, the light guide device and the light source device according to a twelfth embodiment of the present invention will be explained with reference to FIGS. 16 to 20. FIG. 16 is a perspective view of the light source device according to the twelfth embodiment. FIG. 17 is a partially enlarged sectional view of the light source device according to the eleventh embodiment. FIG. 18 is a view explaining the method for fabricating the light guide device according to the twelfth embodiment. FIG. 19 is a view explaining a method for fabricating a light guide device using acrylic polymerization adhesion. FIG. 20 is a view explaining the operation of the light source device according to the twelfth embodiment.

As shown in the eleventh embodiment, since the exit surface 46 defined by the light guide devices 10 is constituted by hexagonal pole-shaped light guide devices 10, a matrix layout can be made. But the exit end surface of the respective light guide devices have fine curved surfaces 68 as shown in FIG. 17, and subtly varied sizes of the light guide devices occurring in their manufacturing process. Accordingly there is a possibility that the exit surface 46 may have gaps 70.

Because of such fine curved surfaces 68 of the light guide devices 10, a refractive index of light is changed in the fine curved surfaces 68, and directivity of the light is deteriorated. Because of gaps 70, the gaps 70 between the light guide devices 10 are non-light emitting parts, and disuniformity of a luminance takes place on the exit surface 46.

The light source device according to the twelfth embodiment, is characterized by an acrylic resin layer 66 on the exit surface 46 defined by the light guide devices 10 formed in one-piece with the light guide devices 10 so as to solve the above-described problems of the eleventh embodiment.

That is, a plurality of linear light sources 40 arranged in parallel with each other are accommodated in a reflection box 52 having the inside surface covered with a silver reflecting surface. A number of pin hole-shaped openings 24 are formed in the surface of the reflection box 52. In the respective pin hole-shaped openings 24 the light guide devices 10 are disposed with the exit end surfaces 12 directed to the liner light source 40 in the reflection box 52. An about hundreds µm-thickness acrylic resin layer 66 is provided on a single flat exit surface 46 defined by the exit end surfaces 14 of the plural light guide devices 10.

Then the method for fabricating the light guide device according to the twelfth embodiment will be explained with reference to FIG. 18.

Figure 18A:
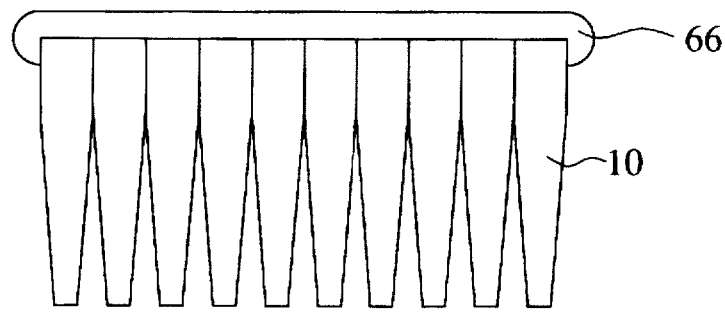
FIGS. 18A to 18C are views (part 1) explanatory of the method for fabricating the light source device according to the twelfth embodiment of the present invention.

First the light guide devices 10 are arranged in plane. Then a UV solidifying acrylic resin having a substantially equal refractive index to that of an acrylic resin forming the light guide devices is applied to the exit surface 46 defined by the light guide devices 10 (FIG. 18A). The UV solidifying acrylic resin is exemplified by, e.g., "3018" by Three Bond.

Figure 18B:
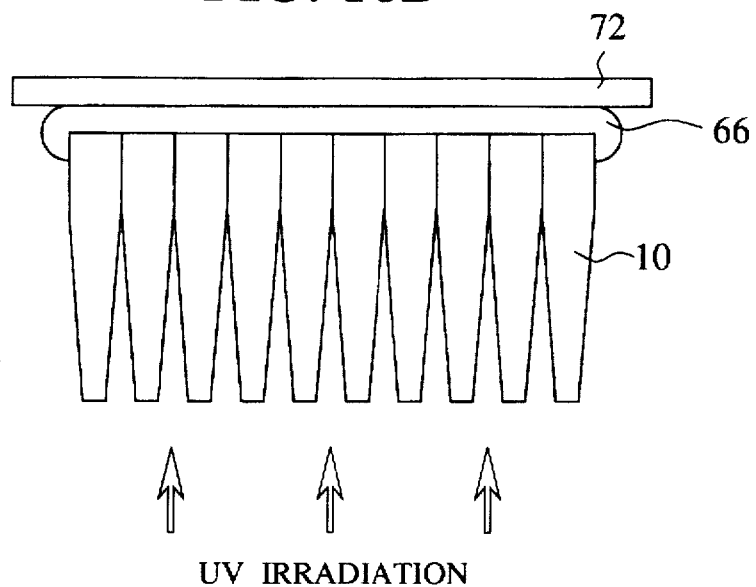
Figure 18C:
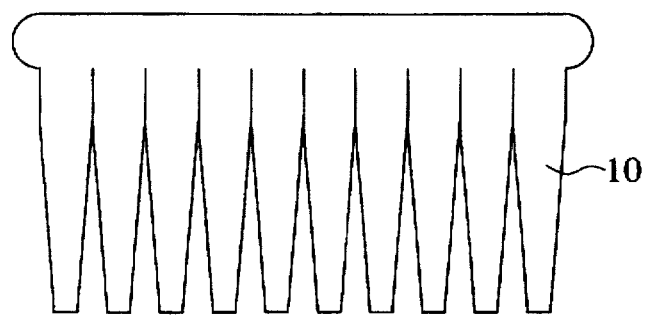

Then, a specular plate 72 which is made from nonadhesive material to acrylic resin is put on the exit surface 46 with acrylic resin applied to (FIG. 18B). Then UV is radiated to solidify the acrylic resin, and next the specular plate 72 is put off. Thus the light guide device according to the twelfth embodiment is fabricated (FIG. 18C).

The acrylic resin layer 66 may be integrated by acrylic polymerization adhesion as shown in FIG. 19.

Figure 19A:
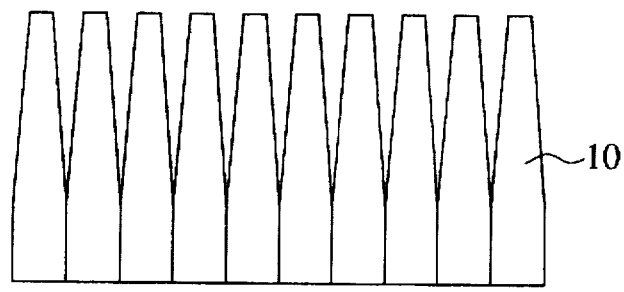
FIGS. 19A to 19C are views (part 2) explanatory of the method for fabricating the light source device according to the twelfth embodiment of the present invention.
Figure 19B:
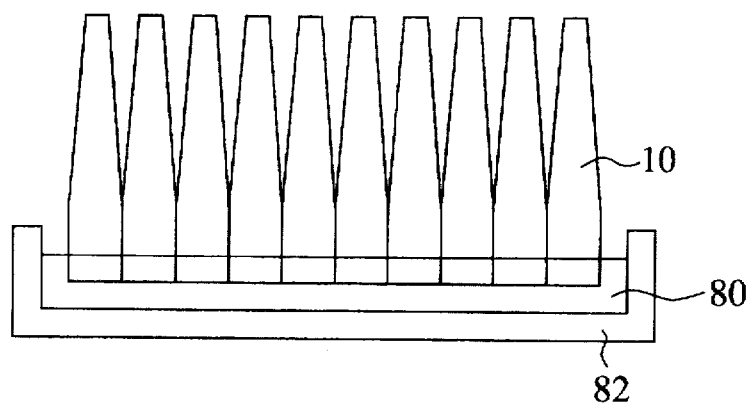
Figure 19C:
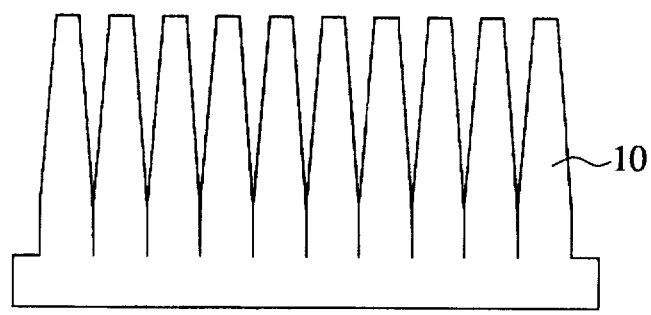
Figure 20A:
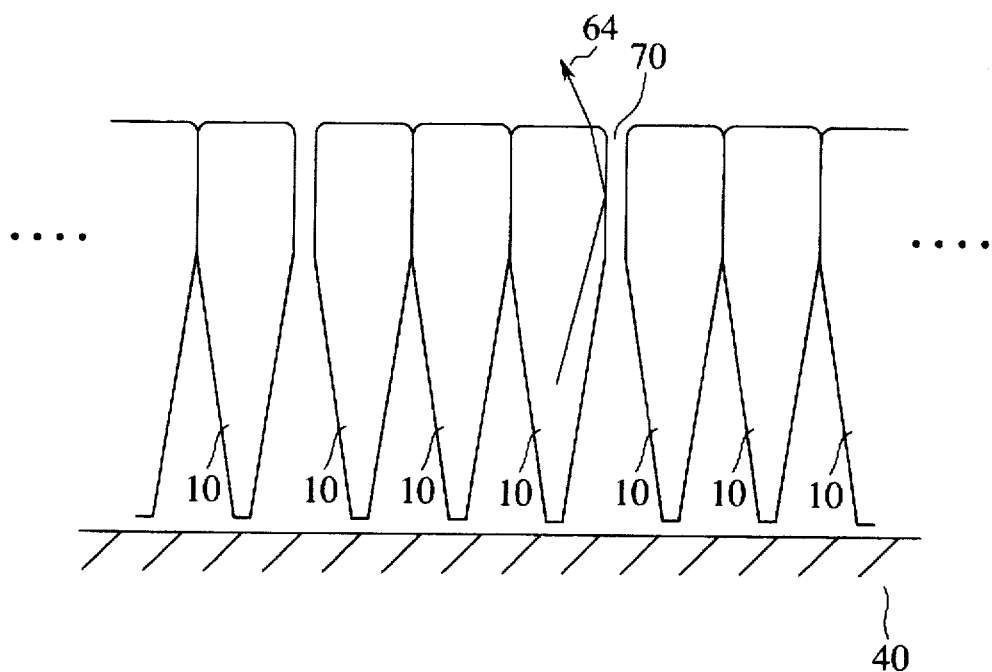
FIGS. 20A and 20B are views explanatory of the operation of the light source device according to the twelfth embodiment of the present invention.
Figure 20B:
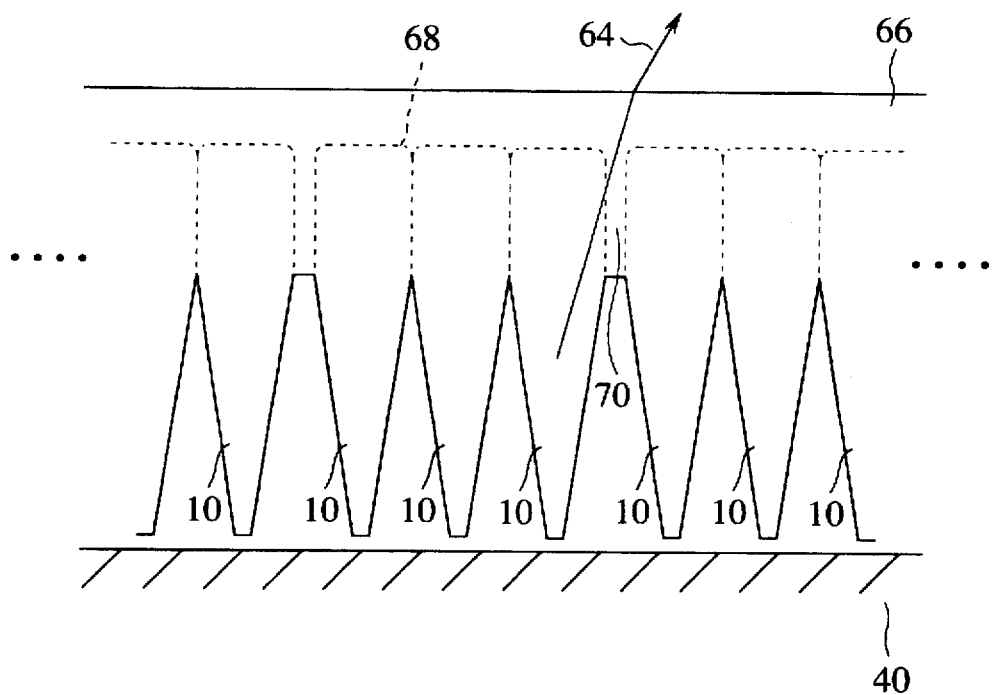

In this case, first the light guide devices 10 are arranged in plane (FIG. 19A). A mixed liquid 80 of acrylic monomer and a hardener is placed in a vessel 82 having the inside bottom formed in speculum. Then the light guide devices 10 arranged with the exit surfaces faced downward (FIG. 19B). The hardener is exemplified by, e.g., "Acryl Bond" by Mitsubishi Rayon. Then the container is left at the room temperature to let the polymerization adhesion start. After the acrylic resin layer 66 has been solidified, the container 82 is put off, and the light guide device is formed (FIG. 19C).

Next the operation of the light source device according to the twelfth embodiment will be explained with reference to FIG. 20.

In the case that the acrylic resin layer 66 is not provided on the exit surface 46 (FIG. 20A), when gaps 70 are present between the light guide devices 10, light which has entered the light guide devices 10 are totally reflected on the side surfaces of the light guide devices 10. Accordingly no light exits in the gaps 70 between the light guide devices 10. In contrast to this case, in the case that the acrylic resin layer 66 is formed integrally (FIG. 20B), because of a small refractive index difference between the light guide devices 10 and the acrylic resin layer 66, incident light is not totally reflected but can exit also at the gaps 70. Thus the exit surface 46 can be free from disuniformity of luminances which depend on the gaps 70 between the light guide devices 10.

Since the fine curved surfaces 68 of the light guide devices 10 are planarized by application of acrylic resin, no change is made to the refracting surface, and accordingly directivity provided by the light guide devices 10 is not lost. In addition, when the acrylic resin layer 66 is solidified, the specular plate is placed on the surface of the light guide devices 10, which prevents generation of fine convexities and concavities therein.

Thus according to the twelfth embodiment, the acrylic resin layer 66 having substantially the same refractive index as the acrylic resin of the light guide devices 10 is provided integral with the light guide devices 10 on the exit surface 46 defined by the light guide devices 10. Accordingly the light source device can have little disuniformity of a luminance and good directivity.

To obtain the products of the light guide device which have the directivity below about ±20°, it is preferable that a refractive index ratio between the resin layer and the light guide device is above about 0.97.

Then, the light guide device according to a thirteenth embodiment of the present invention will be explained with reference to FIGS. 21 and 22.

Figure 21:
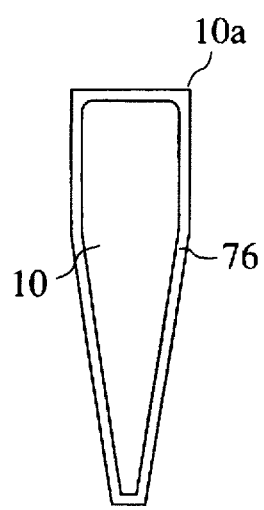
FIG. 21 is a sectional view of the light guide device according to a thirteenth embodiment of the present invention.

FIG. 21 is a sectional view of the light guide device according to the thirteenth embodiment. FIG. 22 is view explaining the method for fabricating the light guide device according to the thirteenth embodiment.

The light guide device 10a according to the thirteenth embodiment is characterized in that the light guide device 10 according to the above-described first embodiment has the exterior surface covered with a coating layer 76 of a transparent silicone material of a lower hardness than the light guide device 10.

The method for fabricating the light guide device according to the thirteenth embodiment will be explained with reference to FIG. 22.

Figure 22A:
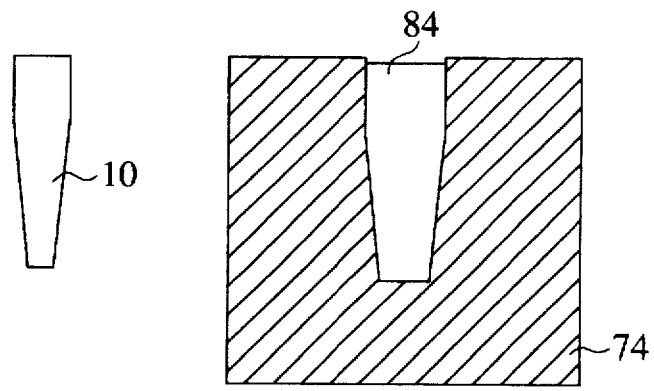
FIGS. 22A to 22C are views explanatory of the method for fabricating the light guide device according to the thirteenth embodiment of the present invention.
Figure 22B:
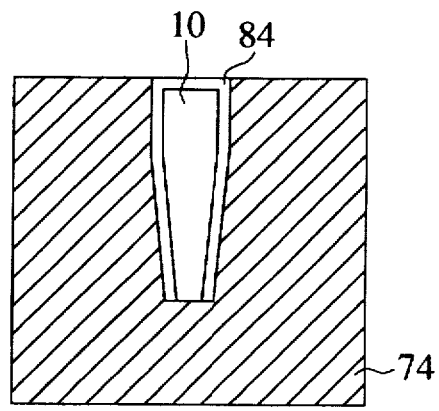
Figure 22C:
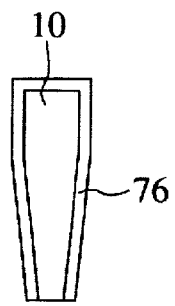

First the light guide device 10 is formed of transparent acrylic resin. Next, a mold 74 for the light guide device, which is larger than the same by, e.g., about 0.5 mm is prepared, and then liquid silicone 84 is poured into the mold 74 (FIG. 22A). Next, the light guide device 10 is put in the mold 74 with the transparent silicone 84 loaded in, and in this state the silicone is solidified (FIG. 22B). Thus the light guide device 10a covered with the coating layer 76 of transparent silicone is completed (FIG. 22C).

The arrangement of a plurality of the light guide devices as in the above-described embodiment has a risk of forming gaps 70 between each light guide device 10 and its adjacent ones. But coating a group of the light guide devices 10a of acrylic resin with the coating layer 76 as in the thirteenth embodiment, the transparent silicone material forming the coating layer 76 is flexible enough to fully bury the gaps between each of the arranged light guide devices 10a and its adjacent ones 10a.

Thus according to the thirteenth embodiment, the exterior surface of the light guide devices 10 are coated with the coating layer 76 of a lower hardness, and the light source device can have little luminance disuniformity.

Next, a fourteenth embodiment of the present invention will be explained with reference to FIGS. 23 and 24.

Figure 23:
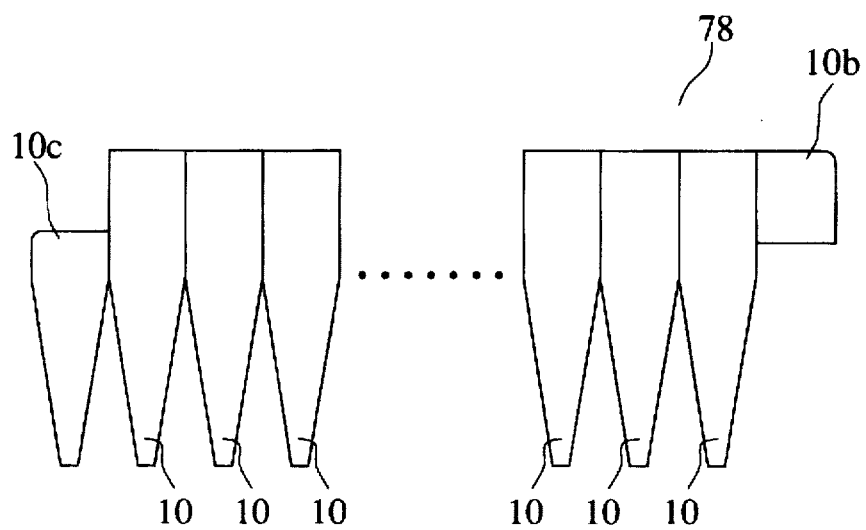
FIG. 23 is a side view of the light guide device according to a fourteenth embodiment of the present invention.
Figure 24:
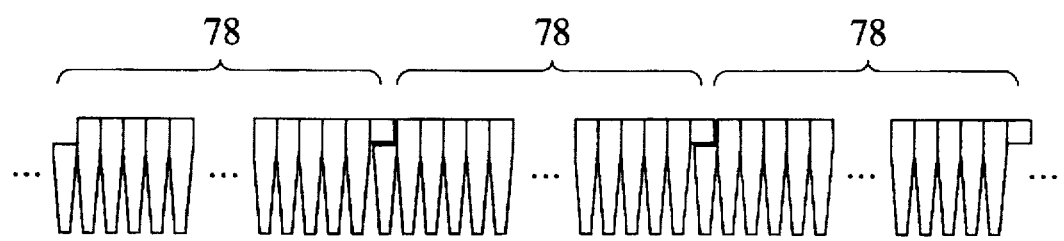
FIG. 24 is a view of a layout of a plurality of the light guide devices according to the fourteenth embodiment.

FIG. 23 is a side view of a light guide device according to the fourteenth embodiment, and FIG. 24 is a view of a layout of a plurality of the light guide devices according to the fourteenth embodiment.

The light source device according to the fourteenth embodiment is characterized in that a plurality of the light guide devices 10 are interconnected to each other in a line of light guide devices 78 so as to solve the problem of the eleventh embodiment.

That is, the light guide devices 10 according to the first embodiment are interconnected to each other in a line, and both ends of the line have partial shapes. A partial shape of one end 10b, and a partial shape of the other end 10c are combined into substantially the same shape of the light guide devices 10. In each line of the light guide devices 78 of FIG. 23, one end 10b has the upper one of the light guide device divided in an upper and a lower part, and the other end 10c has the lower one.

Such lines of the light guide devices 78 are sequentially arranged as in FIG. 24 to form a group of the light guide devices, and each group of the light guide devices 78 can be made up. At the connection between each line of the light guide devices 78 and its adjacent one, one light guide device made up by the ends 10b, 10c is formed.

Then the operation of the light guide device constituted by the ends 10b, 10c of each line of the light guide devices will be explained.

Light which has been incident on the lower part of the light guide devices 10 passes through the interior of the light guide device, increasing directivity. When the light arrives at the joint surface with the end 10b having the upper shape of the light guide device 10, the light is substantially perpendicular to the joint surface, and accordingly the light passes through the joint surface without lowering its intensity to be incident on the end 10b. Thus the light guide device constituted by the end 10b having the upper shape, and the end 10c having the lower shape can have the same characteristics as the other light guide devices. Accordingly no luminance disuniformity takes place.

Thus according to the fourteenth embodiment, a plurality of the light guide devices 10 are interconnected to each other in a line of the light guide devices 78. Accordingly non-light emitting parts are absent, and groups of the light guide devices having a uniform luminance on the surface can be formed.

In the fourteenth embodiment both ends 10b, 10c of a line of the light guide devices 78 have partial shapes of the light guide device, but it is possible that either one of both ends of the line of the light guide devices has a partial shape of the light guide device 10.

The liquid crystal display device according to a fifteenth embodiment will be explained with reference to FIG. 25.

Figure 25:
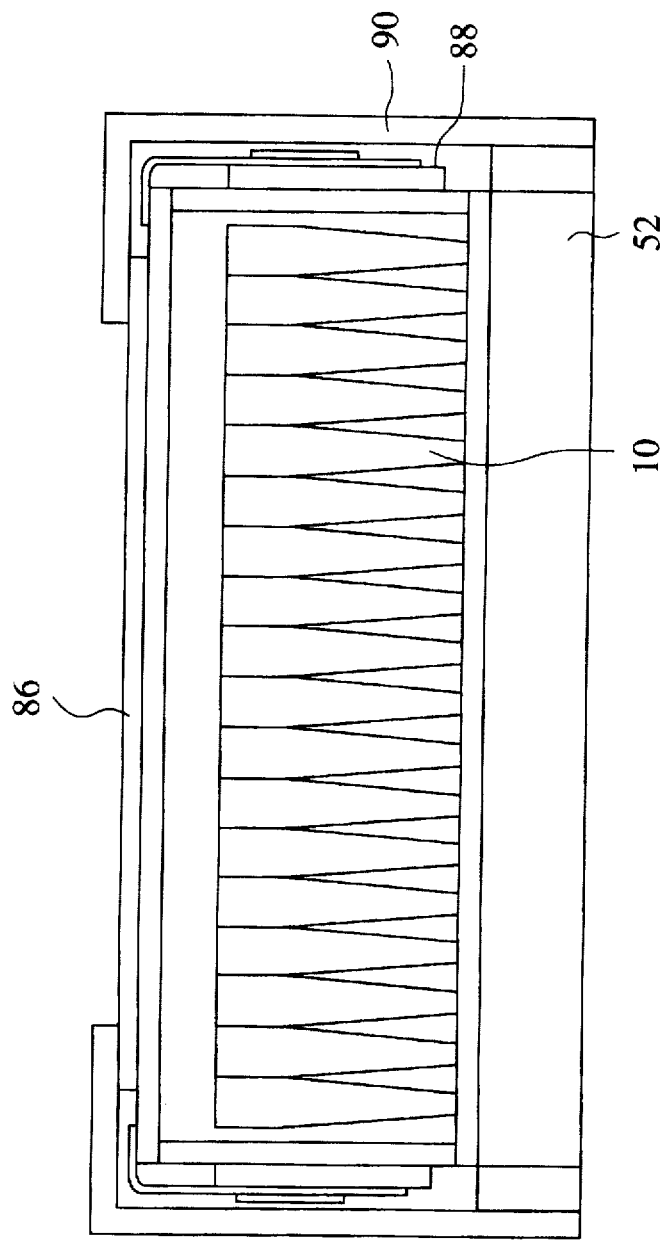
FIG. 25 is a sectional view of the liquid crystal display device according to a fifteenth embodiment of the present invention.

FIG. 25 is a sectional view of the liquid crystal display device according to the fifteenth embodiment.

The liquid crystal display device according to the present embodiment has a liquid crystal panel 86 disposed on an exit end surface of a light source device of the eleventh embodiment.

That is, a plurality of parallelly arranged linear light sources (not shown) are accommodated in a reflection box 52 having the inside surface coated with a silver reflecting surface. A number of openings (not shown) in the form of pinholes are formed in a surface of the reflection box 52 in a matrix. In the respective openings in the form of pinholes there are disposed light guide devices 10 with the incident end surfaces opposed to the linear light sources in the reflection box 52. The exit end surfaces of the plurality of light guide devices 10 define a single flat exit surface on the same level.

On the exit end surfaces of the respective light guide devices there is sealed a liquid crystal material between two sheets of glass, and voltages are applied to electrodes between the sheets of glass. Thus a liquid crystal panel 86 which functions as a display device is formed. The liquid crystal panel 86 is connected to a liquid crystal drive circuit 88. The liquid crystal display device has the exterior covered by a metallic vessel 90.

Thus, the liquid crystal display device according to the fifteenth embodiment has the small-sized light source device which can emit highly directive light beams at high efficiency, whereby the liquid crystal display device can be small in size and can display at very high luminance of above ten thousands $cd/m^2$. Such a liquid crystal display device is applicable to outdoor display boards, display boards which have to be looked from a distance, etc.

The liquid crystal display device according to a sixteenth embodiment will be explained with reference to FIG. 26.

Figure 26:
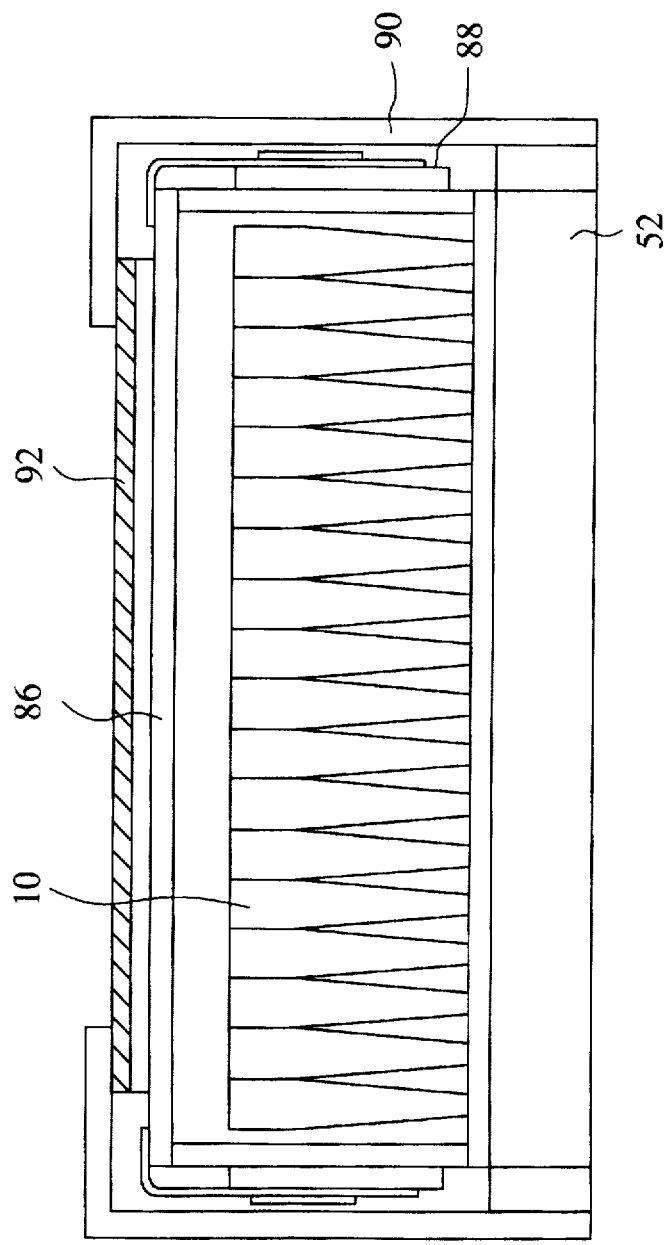
FIG. 26 is a sectional view of the liquid crystal display device according to a sixteenth embodiment of the present invention.
Figure 27:
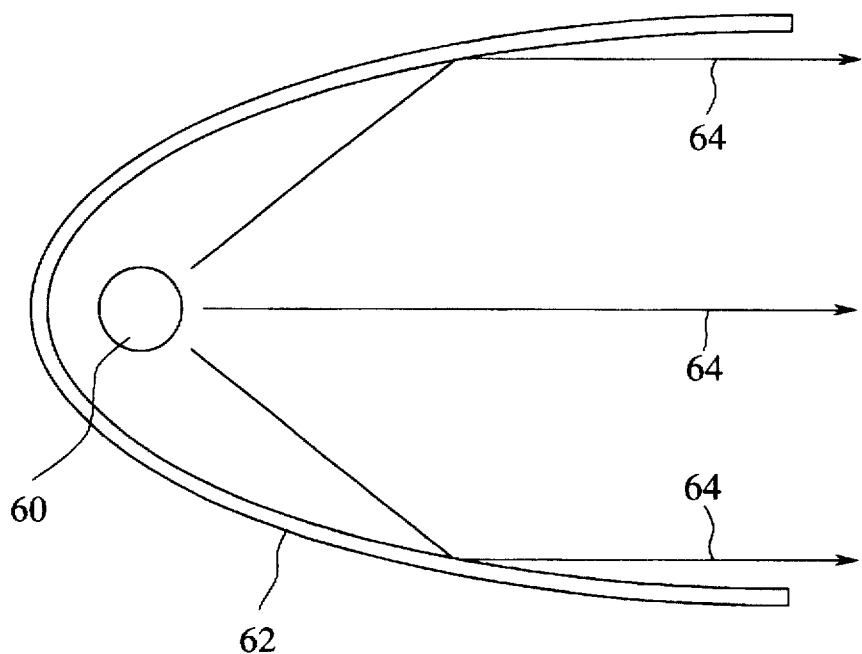
FIG. 27 is a schematic sectional view of the conventional light source device.

FIG. 26 shows a sectional view of the liquid crystal display device according to the sixteenth embodiment.

The liquid crystal display device according to the present embodiment is characterized in that a light diffusing sheet 92 is provided on the surface of the liquid crystal display device according to the fifteenth embodiment.

That is, a plurality of parallelly arranged linear light sources (not shown) are accommodated in a reflection box 52 having the interior surface coated with a silver reflecting surface. In a surface of the reflection box there are formed a number of openings (not shown) in the form of pinholes in a matrix. Light guide devices 10 are provided in the number of openings in the form of pinholes with the incident end surfaces opposed to the linear light source in the reflection box 52, so that a single flat exit surface.

On the exit end surfaces of the light guide devices 10 a liquid crystal material is sealed between two sheets of glass, and voltages are applied to respective electrodes between the sheets of glass. Thus a liquid crystal panel 86 functioning as a display device is provided. Liquid crystal drive circuit 88 is connected to the liquid crystal panel 86 for driving the liquid crystal panel. On the liquid crystal panel 86 there is provided a light diffusing sheet 92 for diffusing light beams of directivity which have exited from the light guide devices 10 and passed the liquid crystal panel. The liquid crystal display device has the exterior covered by a metallic vessel 90.

Thus, according to the sixteenth embodiment, the light diffusing sheet 92 is provided on the liquid crystal panel 86, whereby directive beams which have exited the light guide devices 10 and passed through the liquid crystal panel are diffused, whereby the liquid crystal display device can be free from color tone changes depending on visual angles over a wide field angle.

In the fifteenth and the sixteenth embodiments, the liquid crystal display devices use the light source device of the eleventh embodiment, but liquid crystal display devices can be fabricated by using directive light source devices which can emit light beams in plane. Liquid crystal display devices can include the light source device of any one of the above-described embodiments.

What is claimed is:

1. A light source device comprising:
   a light source;
   a reflection box having an inside wall coated with a reflecting surface, and containing the light source;
   an opening formed in a side of the reflection box; and
   a light guide device comprising a pole-shaped transparent cylindrical body having an incident end surface on which light is incident having a smaller area, and an exit end surface at which light exits in light rays having a larger area, disposed with the incident end surface opposed to the light source, at least one of the incident end surface and the exit end surface being polygonal.

2. A light source device according to claim 1 wherein,
   the light guide device further comprises an assistant member in a form of a prism disposed on the exit end surface of the light guide device, for correcting a direction of the exit light ray.

3. A light source device according to claim 1 wherein,
   the light guide device further comprises a coating layer disposed on an outer circumferential portion of the transparent pole-shaped body and having a hardness below the transparent pole-shaped body.

4. A light source device according to claim 1 wherein, the light guide device further comprises:
   a line of the light guide devices arranged in parallel with each other, and formed integral;
   a first connection disposed on one end of the line of the light guide devices, and having a partial shape of the light guide devices; and
   a second connection disposed on the other end of the line of the light guide devices, having a partial shape of the light guide devices which is different from that of the first connection.

5. A light source device according to claim 1 wherein:
   an end portion of the light guide device near the incident end surface of the light guide device is inserted in the opening so that the light guide device is held by the reflection box.

6. A light source device according to claim 1 wherein the incident and surface of the light guide device and the exit end surface of the light guide device are substantially parallel with each other.

7. A light source device according to claim 1 further comprising:
   a light guide unit including light guide devices arranged in rows or in planes; and
   a resin layer formed on the exit end surfaces of the arranged light guide devices in one piece therewith.

8. A light source device according to any of claims 1, 2, 3, 4, or 7, wherein
   there is disposed a light guide member for optically coupling the opening and the incident end surface of the light guide device.

9. A light source device according to claim 8, wherein
   the light guide member is a flexible fiber light guide member.

10. A light source device according to claim 8, wherein
    the light guide member is a pole-shaped member having a slant reflecting surface on the end surface contacting the incident end surface of the light guide device.

11. A light source device according to claim 9, wherein
    the light source is a linear light source;
    the opening is a stripe or a plurality of pinholes linearly arranged along the linear light source;
    the fiber light guide member is a plurality of bundles of fiber light guide members for optically coupling the opening in the shape of a stripe or a plurality of pinholes with the incident end surfaces of the plural light guide devices arranged in a matrix; and
    the plural fiber light guide members are adjusted in terms of length and flexure so that the exit end surfaces of the light guide devices are arranged in a line or a matrix on the same level.

12. A light source device according to claim 10, wherein
    the light source is a linear light source;
    the opening is a stripe or a plurality of pinholes linearly arranged along the linear light source;
    the pole-shaped light guide member is a plurality of bundles of pole-shaped light guide members for optically coupling the opening in the shape of the stripe or the plural pinholes with the incident end surfaces of the plural light guide devices arranged in a matrix;
    pole-shaped transparent assistant members of set lengths are disposed between the slant reflecting surfaces of the pole-shaped light guide members and the incident end surfaces of the light guide device, or on the forward ends of the light guide devices; and
    the assistant light guide members are adjusted in terms of length so that the exit end surfaces of the light guide devices are arranged in a line or a matrix on the same level.

13. A light source device according to any of claims 1, 2, 3, 4, or 7, wherein
    the light source is a substantial point light source;
    the opening is at least one pinhole; and
    the light guide device is disposed in the pinhole.

14. A light source device according to claim 13, wherein
    the plurality of the light guide devices are arranged in a fan-shape.

15. A light source device according to claim 13, wherein
    there is provided a reflecting mirror for reflecting light exiting from the exit end surfaces of the light guide devices arranged in a line or a matrix, and reflected light from the reflecting mirror is substantially parallel light rays.

16. A light source device according to any of claims 1, 2, 3, 4, or 7, wherein the light source is a substantial point light source;

the opening is a slit;

a plurality of the light guide devices are arranged linearly along the slit; and the light guide devices arranged linearly along the slit are arranged in at least one line.

17. A light source device according to claim 16, wherein there is provided a reflecting mirror for reflecting light exiting from the exit end surfaces of the light guide devices arranged in a line or a matrix, and reflected light from the reflecting mirror is substantially parallel light rays.

18. A light source device according to any of claims 1, 2, 3, 4, or 7, wherein the light source is a linear light source;

the opening is a plurality of pinholes arranged in a line or matrix along the linear light source; and a plurality of the light guide devices are arranged in a line or a matrix along the arrangement of the pinhole-shaped openings.

19. A light source device according to claim 18, wherein the plurality of the light guide devices are arranged in a fan-shape.

20. A light source device according to claim 18, wherein there is provided a reflecting mirror for reflecting light exiting from the exit end surfaces of the light guide devices arranged in a line or a matrix, and reflected light from the reflecting mirror is substantially parallel light rays.

21. A light source device according to claim 18, wherein the exit end surfaces of the arranged light guide device are on the same level.

22. A light source device according to any of claims 1, 2, 3, 4, or 7, wherein the light source is a linear light source;

the opening is a slit, and a plurality of the slits are disposed along the linear light source;

a plurality of the light guide devices are disposed along the slit, and a plurality of lines of the light guide devices are disposed along the arrangement of the slit; and exit end surfaces of the light guide devices are arranged in a line or a matrix.

23. A light source device according to claim 22, wherein the plurality of the light guide devices are arranged in a fan-shape.

24. A light source device according to claim 22, wherein there is provided a reflecting mirror for reflecting light exiting from the exit end surfaces of the light guide devices arranged in a line or a matrix, and reflected light from the reflecting mirror is substantially parallel light rays.

25. A light source device according to claim 22, wherein the exit end surfaces of the arranged light guide devices are on the same level.

26. A light source device according to any of claims 1, 2, 3, 4, or 7, wherein the light source is a plurality of parallel linear light sources;

the opening is a plurality of pinholes arranged in a matrix; and a plurality of the light guide devices are arranged in a matrix corresponding to the matrix of the pinhole.

27. A light source device according to claim 26, wherein the exit end surfaces of the arranged light guide devices are on the same level.

28. A liquid crystal display device comprising:

a light source device having:

a light source;

a reflection box having an inside wall coated with a reflecting surface, and containing the light source;

an opening formed in a side of the reflection box; and a light guide device comprising a pole-shaped transparent cylindrical body having an incident end surface on which light is incident having a smaller area, and an exit end surface at which light exits in light rays having a larger area, disposed with the incident end surface opposed to the light source, at least one of the incident end surface and the exit end surface being polygonal; and a liquid crystal panel disposed on the exit end surface of the light source device.

29. A liquid crystal display device according to claim 28 wherein, the light guide device further comprises an assistant member in a form of a prism disposed on the exit end surface of the light guide device, for correcting a direction of the exit light ray.

30. A liquid crystal display device according to claim 28 wherein, the light guide device further comprises a coating layer disposed on an outer circumferential portion of the transparent pole-shaped body and having a hardness below the transparent pole-shaped body.

31. A liquid crystal display device according to claim 28 wherein, the light guide device further comprises:

a line of the light guide devices arranged in parallel with each other, and formed integral;

a first connection disposed on one end of the line of the light guide devices, and having a partial shape of the light guide devices; and a second connection disposed on the other end of the line of the light guide devices, having a partial shape of the light guide devices which is different from that of the first connection.

32. A liquid crystal display device according to claim 28 wherein said light source device further comprising:

a light guide unit including light guide devices arranged in rows or in planes; and a resin layer formed on the exit end surfaces of the arranged light guide devices in one piece therewith.

33. A liquid crystal display device according to any of claims 28, 29, 30, 31 or 32, further comprising a light diffusing sheet for diffusing light beams of directivity disposed on the liquid crystal panel.

34. A liquid crystal display device according to any of claims 28, 29, 30, 31 or 32 wherein there is disposed a light guide member for optically coupling the opening and the incident end surface of the light guide device.

35. A liquid crystal display device according to claim 34, further comprising a light diffusing sheet for diffusing light beams of directivity disposed on the liquid crystal panel.

36. A liquid crystal display device according to claim 34 wherein the light guide member is a flexible fiber light guide member;

the light source is a linear light source;

the opening is a stripe or a plurality of pinholes linearly arranged along the linear light source;

the fiber light guide member is a plurality of bundles of fiber light guide members for optically coupling the opening in the shape of a stripe or a plurality of pinholes with the incident end surfaces of the plural light guide devices arranged in a matrix; and the plural fiber light guide members are adjusted in terms of length and flexure so that the exit end surfaces of the light guide devices are arranged in a line or a matrix on the same level.

37. A liquid crystal display device according to claim 36, further comprising a light diffusing sheet for diffusing light beams of directivity disposed on the liquid crystal panel.

38. A liquid crystal display device according to claim 34 wherein the light guide member is a pole-shaped member having a slant reflecting surface on the end surface contacting the incident end surface of the light guide device;

the light source is a linear light source;

the opening is a stripe or a plurality of pinholes linearly arranged along the linear light source;

the pole-shaped light guide member is a plurality of bundles of pole-shaped light guide members for optically coupling the opening in the shape of the stripe or the plural pinholes with the incident end surfaces of the plural light guide devices arranged in a matrix;

pole-shaped transparent assistant members of set lengths are disposed between the slant reflecting surfaces of the pole-shaped light guide members and the incident end surfaces of the light guide device, or on forward ends of the light guide devices; and the assistant light guide members are adjusted in terms of length so that the exit end surfaces of the light guide devices are arranged in a line or a matrix on the same level.

39. A liquid crystal display device according to claim 38, further comprising a light diffusing sheet for diffusing light beams of directivity disposed on the liquid crystal panel.

40. A liquid crystal display device according to any of claims 28, 29, 30, 31 or 32 wherein the light source is a linear light source;

the opening is a plurality of pinholes arranged in a line or a matrix along the linear light source;

a plurality of the light guide devices are arranged in a line or a matrix along the arrangement of the pinhole-shaped openings; and the exit end surfaces of the arranged light guide devices are on the same level.

41. A liquid crystal display device according to claim 40, further comprising a light diffusing sheet for diffusing light beams of directivity disposed on the liquid crystal panel.

42. A liquid crystal display device according to any of claims 28, 29, 30, 31 or 32 wherein the light source is a plurality of parallel linear light sources;

the opening is a plurality of pinholes arranged in a matrix;

a plurality of the light guide devices are arranged in a matrix corresponding to the matrix of the pinhole; and the exit end surfaces of the arranged light guide devices are on the same level.

43. A liquid crystal display device according to claim 42, further comprising a light diffusing sheet for diffusing light beams of directivity disposed on the liquid crystal panel.

* * * * *